United States Patent [19]

Sheikh

[11] Patent Number: 5,741,357

[45] Date of Patent: Apr. 21, 1998

[54] HYDRATED HIGH ALUMINA CEMENT

[76] Inventor: Shamim A. Sheikh, 325 Bogert Ave., #505, Willowdale, Ontario, Canada, M2N 1L8

[21] Appl. No.: 517,713

[22] Filed: Aug. 21, 1995

Related U.S. Application Data

[63] Continuation-in-part of Ser. No. 184,477, Jan. 21, 1994, abandoned.

[51] Int. Cl.⁶ ................................ C04B 7/32; C04B 7/51
[52] U.S. Cl. ........................ 106/692; 106/693; 106/695; 106/696; 106/732; 106/735; 106/783; 428/404
[58] Field of Search .............................. 106/692, 693, 106/696, 695, 703, 704, 713, 715, 721, 722, 724, 732, 775, 778, 783, 823, 735, 776, 787, 785; 428/403, 404, 387

[56] References Cited

U.S. PATENT DOCUMENTS

| | | | |
|---|---|---|---|
| 3,775,143 | 11/1973 | Mikhailov et al. | 106/695 |
| 3,973,978 | 8/1976 | Nakagawa et al. | 106/696 |
| 3,997,353 | 12/1976 | Chervenka, Jr. et al. | 106/695 |
| 4,157,263 | 6/1979 | Gaines et al. | 106/695 |
| 4,350,533 | 9/1982 | Galer et al. | 106/695 |
| 4,488,909 | 12/1984 | Galer et al. | 106/695 |
| 4,769,077 | 9/1988 | Crocker | 106/695 |

FOREIGN PATENT DOCUMENTS

| | | | |
|---|---|---|---|
| 0946427 | 4/1974 | Canada | 261/49 |
| 1004237 | 1/1977 | Canada | 261/64 |
| 1018735 | 10/1977 | Canada | 261/71 |
| 1182481 | 2/1985 | Canada | 261/45 |
| 1217210 | 1/1987 | Canada | 261/66 |
| 2018889 | 6/1990 | Canada | 261/64 |
| 1506417 | 4/1978 | United Kingdom . | |
| 2166430 | 5/1986 | United Kingdom . | |

OTHER PUBLICATIONS

Canadian Journal of Civil Engineering—"Expansive Concrete Drilled Shafts"—S.A. Sheikh et al—vol. 12, No. 2, (1985)—pp. 382–395 No Month Available.

"Long–Term Behavior of Expansive Concrete Drilled Shafts"—S.A. Sheikh et al—Dept. Civil Eng.—Univ. of Houston, TX—pp. 213–217—rec'd May 15, 1985—Revised—Accepted Nov. 29, 1985 (1985) No Month of Publishing Available.

Characteristics of Shrinkage Compensating Expansive Cement Containing a Pre–hydrated High Alumina Cement-–based Expansive Additive—Y. Fu et al.—Cement and Concrete Research—vol. 24, No. 2, 267–276, (Feb., 1994).

*Primary Examiner*—Paul Marcantoni
*Attorney, Agent, or Firm*—Riches, McKenzie & Herbert

[57] ABSTRACT

A hydraulic cement composition is disclosed which utilizes as part of an expansive component novel coated particles of high alumina cement. The particles have a core of substantially unhydrated high alumina cement and an outer layer of hydration products of the core, which outer layer delays the reaction of the particles with other materials in the composition. By varying the nature and relative amounts of the coated particles the amount the cement composition may expand and the setting time of the cement may be varied. The coated particles may be formed by partial hydration, drying and grinding of a mixture of high alumina cement powder alone with water.

27 Claims, 15 Drawing Sheets

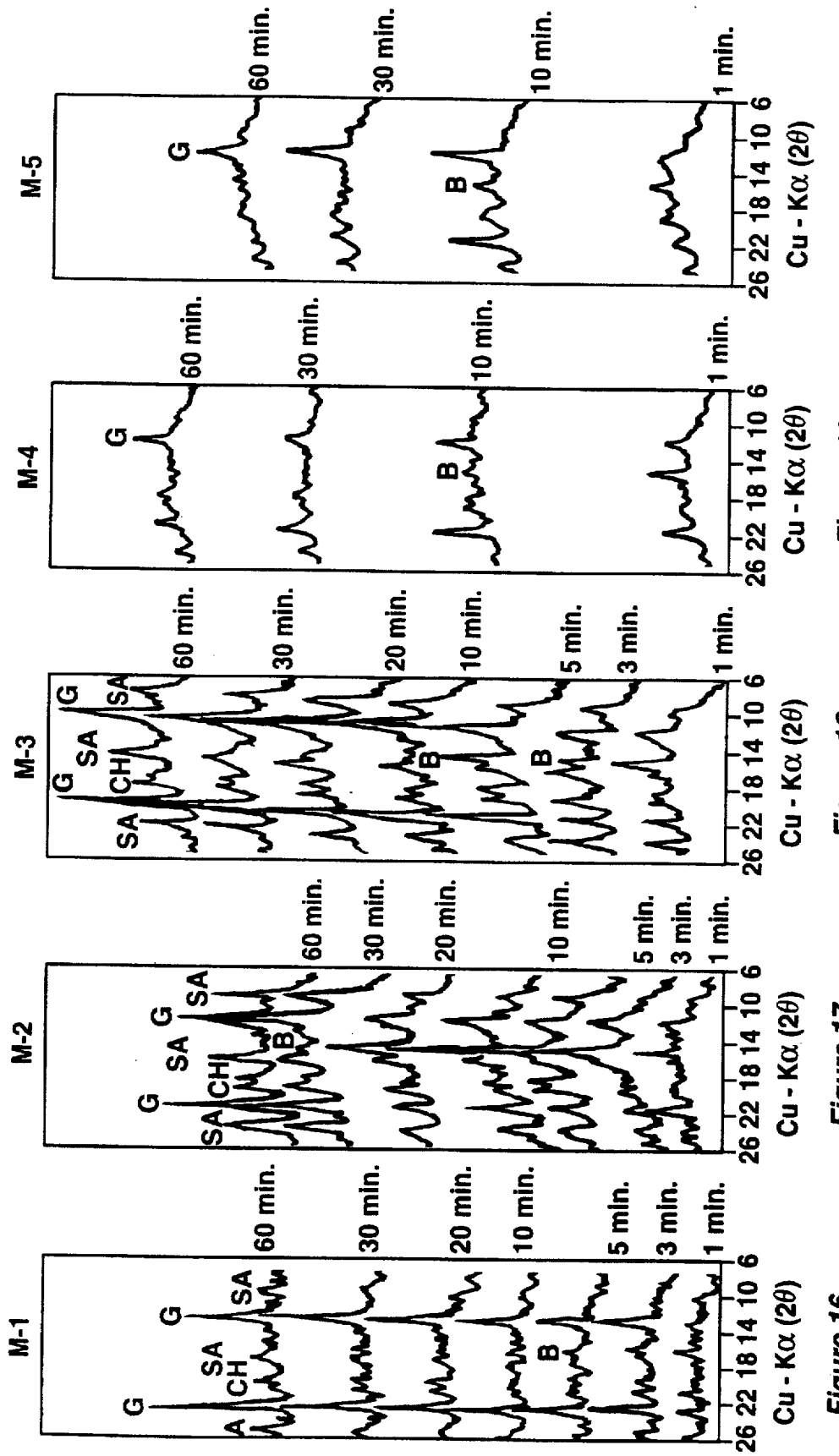

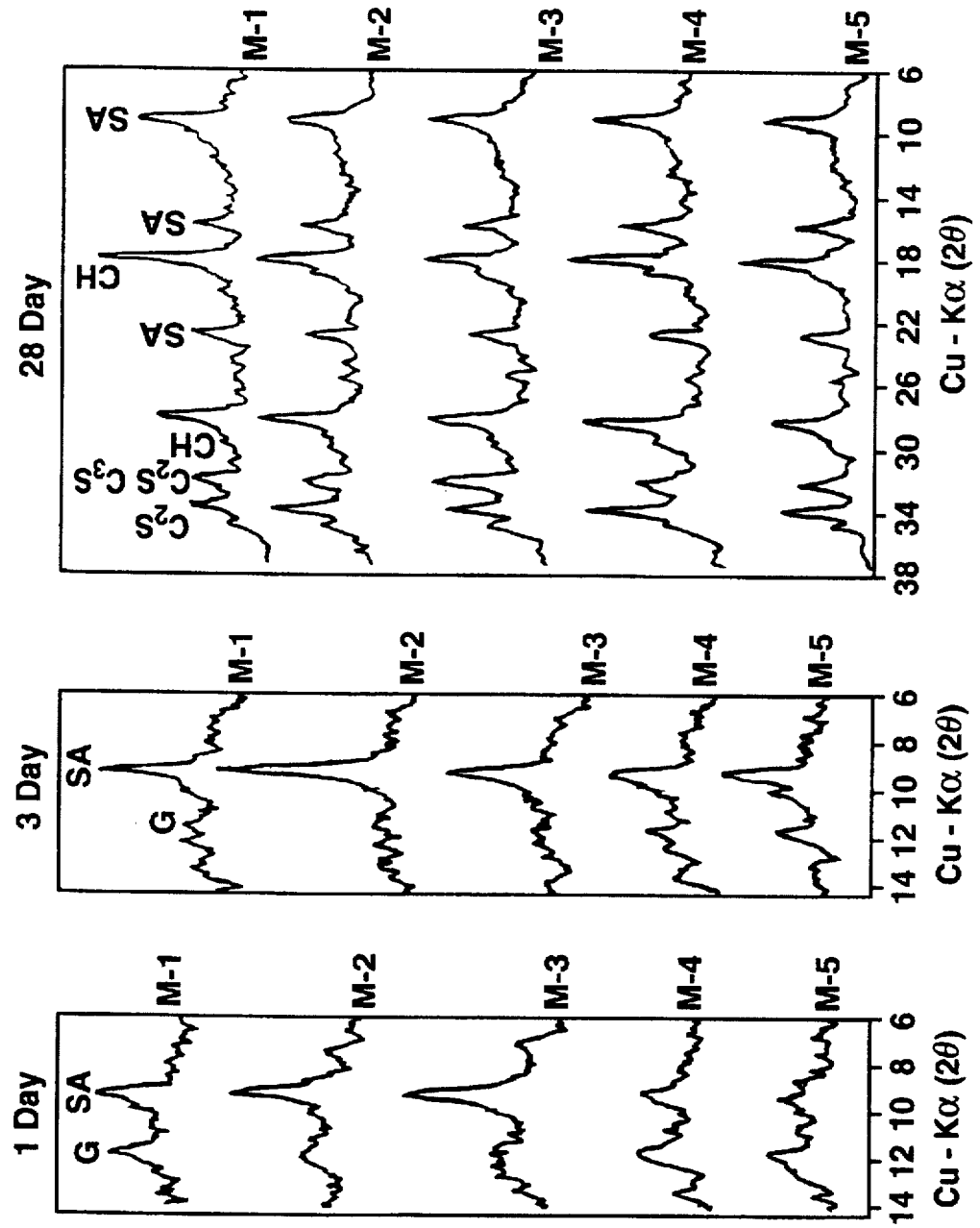

HYDRATED HIGH ALUMINA CEMENT

This application is a continuation-in-part of U.S. patent application Ser. No. 08/184,477, filed on Jan. 21, 1994, now abandoned.

SCOPE OF THE INVENTION

This invention relates to hydraulic cement compositions containing an expanding component, more particularly a hydrated high alumina cement.

BACKGROUND OF THE INVENTION

Conventional concrete typically comprises Portland cement mixed with aggregate such as crushed stone, gravel and sand, and water. Such conventional concrete shrinks by as much as 0.05% to 0.1% by volume during the curing process. This shrinkage may be a disadvantage in certain applications.

It is known that the disadvantages of shrinkage may be at least partially overcome by mixing an expanding component with Portland cement to form an expansive cement. The expansive cement when mixed with aggregate and water forms an expansive concrete. The expanding component may either compensate for shrinkage of the concrete, or cause the concrete to expand during the curing process.

Portland cement is a type of hydraulic cement in the form of finely divided, gray powder composed of lime, alumina, silica, and iron oxide as in tetracalcium aluminoferrate ($4CaO.Al_2O_3.Fe_2O_3$), tricalcium aluminate ($3CaO.Al_2O_3$), tricalcium silicate ($3CaO.SiO_2$), and dicalcium silicate ($2CaO.SiO_2$). These are abbreviated, respectively, as $C_4AF$, $C_3A$, $C_3S$, and $C_2S$. Small amounts of magnesia, sodium, potassium, and sulfur may also be present. Hardening typically does not require air and will occur under water.

Portland cement is typically described as being made up of the following constituents:

| | |
|---|---|
| CaO | 60–64 wt. % |
| $SiO_2$ | 18–26 wt. % |
| $Al_2O_3$ | 4–12 wt. % |
| $Fe_2O_3$ | 2–4 wt. % |
| MgO | 1–4 wt. % |
| Other | 2 wt. % |

Portland cement is analyzed as if it were a mixture of the above oxides. However, it is not a simple mixture of these oxides but, rather, a complex mixture of aluminosilicates and oxides, some of which are described above. As used in this disclosure a reference to a percent by weight alumina does not indicate the presence of pure unbonded $Al_2O_3$ but rather the presence of $Al_2O_3$ in this weight percent in the compounds and complexes of hydraulic cement.

The expanding component is typically a mixture comprising high alumina cement (hereinafter sometimes referred to as HAC), gypsum and lime as its major components, for example in a weight ratio of HAC:gypsum:lime of about 22:10:3. HAC, also known as aluminous cement, is well known and typically comprises about 30% to 45% alumina by weight, and typically contains not more than about 60 to 62 wt. % calcium oxide. It is generally known that the formation of ettringite ($3CaO.Al_2O_3.3CaSO_4.32H_2O$) during the curing process is a source of expansive force in expansive cements.

Some commercially available expansive cements may be identified as for example Type K, Type M, and Type S, are based upon portland cements with added sulfoaluminate constituents which provide for the formation of ettringite. Type K cement contains portland cement, calcium sulfate and calcium sulfoaluminate; Type M-portland cement, calcium sulfate and calcium aluminate cement; and Type S-a high tricalcium aluminate portland cement and calcium sulfate.

While the mixing of an expanding component and Portland cement to form an expansive cement assists in overcoming the disadvantage of volume shrinkage, other difficulties arise by reason of the use of expansive cements. One serious disadvantage is that concrete made with highly expansive cement (hereinafter expansive concrete) tends to set extremely quickly, typically having an initial set time of about 10 minutes after mixing with water and a final set time of about 20 minutes after mixing with water. This rapid setting is at least partially caused by the rapid formation of ettringite crystals and other combined hydration products of various ingredients.

Rapid setting is desirable in some applications, such as highway and bridge repair, where it is necessary that concrete sets in a short period of time into a hard mass with sufficient strength to withstand applied stresses and loads.

However, the extremely rapid setting of expansive concrete containing an expansive cement is not always desirable. Under normal circumstances, conventional concrete formed for example with Portland cement and not containing an expansive component (hereinafter normal concrete) has an initial set time of 1 to 2 hours after mixing with water (the start of hydration) and a final set time of 6 to 8 hours after mixing with water. Such normal concrete may be prepared at a central mixing plant and transported some distance to a construction site where, for example, the concrete must remain workable until it is placed in a form or cavity.

It is known to include in both normal and expansive concretes admixtures such as retardants and superplasticizers. For example, it is known that the set time, both of normal Portland cements and expansive cements, can be somewhat extended by the addition of retardants such as sodium citrate and carboxymethylcellulose. However, for many applications these retardants may not achieve sufficient extension of the set time. As well, some of these retardants tend to suppress expansion, even when larger amounts of expansive cement are used. Superplasticizers such as that available under the trade mark LOMAR D are useful for improving the flowability of the concrete at lower water to cement content ratios.

SUMMARY OF THE INVENTION

To at least partially overcome these disadvantages of previously known devices, the present invention provides an expanding component for an expansive cement comprising alumina-bearing particles having an outer coating which delays reaction of alumina-bearing materials in the core of the particles with other materials.

An object of the present invention is to provide an alumina-bearing material for use in an expanding component of an expansive cement which substantially lengthens the set time of the expansive cement.

Another object is to provide an alumina-bearing material for use in an expanding component of an expansive cement which at least partially delays the interaction of the alumina-bearing material with other components in the expansive cement on hydration of the expansive cement.

Another object of the present invention is to provide an expansive cement in which the set time and degree of expansion can be varied and controlled.

Another object of the present invention is to provide an expansive cement in which retardants are not necessarily required to increase the set time.

Another object of the present invention is to provide an expansive cement which may be expansive or shrinkage compensating and which has a set time similar to that of ordinary Portland cement.

The inventor has surprisingly found that alumina-bearing particles having an outer coating can be used in the expanding component of expansive cements. The use of these particles preferably results in expansive cements which have set times approaching those of ordinary Portland cement, while retaining a degree of expansion similar to the original expansive cement. Furthermore, no retardants are necessarily required to extend the set time of expansive cement using preferred forms of this material. Therefore, the expansion of the expansive cement need not be hindered by retardants.

The alumina-bearing particles have an inner core which serves as a source of substantially unhydrated aluminates of hydraulic cement. An outer coating is provided about the inner core which delays reaction between the aluminates in the core and other materials in a cement composition.

Preferably the coating is water penetration resistant as it is believed that such a coating on the alumina-bearing material will slow the water-aided dispersion of aluminates in the expansive cement paste, which is formed by the mixture of water with the expansive cement. Therefore, less aluminates are available for the formation of ettringite, thus slowing the formation of ettringite. Since the rapid setting of expansive cement paste is believed to be at least partially due to rapid formation of ettringite and other hydration products, slowing their formation also lengthens the set time.

The inventors have also found that by varying the particle size of the alumina-bearing particles, by varying the amount of alumina-bearing particles in the expanding component, and by varying the amount of expanding component in the expansive cement, both the set time and the degree of expansion of the expansive cement paste and expansive concretes formed therefrom can be effectively varied and controlled.

As the inner core is to serve as a source of aluminates it preferably comprises substantially unhydrated aluminates of hydraulic cements such as tricalcium aluminate and tetracalcium aluminoferrate. Preferably these aluminates of hydraulic cement when measured as alumina represent a greater weight percent than found in Portland cement preferably greater than about 15%, more preferably greater than about 20% or greater than about 30% by weight of the material forming the inner core.

This inner core preferably contains not only such aluminates but also the conventional calcium components of hydraulic cement such as tricalcium silicate and dicalcium silicate. Preferably the inner core may comprise normal high alumina cement, HAC, powder which of course is understood to be unhydrated and containing aluminates in an amount representing of at least about 30% alumina by weight, as well as other normal calcium components of hydraulic cement.

The outer coating preferably comprises hydration products of the components found in hydraulic cements. Preferably, for simplicity of manufacture the outer coating may comprise hydration products of the substantially unhydrated materials forming the core. Thus in particularly preferred particles the core may comprise unhydrated high alumina cement and the outer coating may comprise the hydration products of high alumina cement, that is a layer of at least partially hydrated high alumina cement thereabout. Such preferred particles are hereinafter referred to as hydrated high alumina cement or H-HAC.

A method of forming the partially hydrated alumina-bearing particles involves the steps of forming a mixture of water and a finely divided powder containing unhydrated aluminates of hydraulic cement, allowing the mixture to at least partially set, then particularizing the resultant product as by breaking into particles, drying and grinding it into a resultant powder. The finely divided input powder of unhydrated aluminate preferably is a fine powder of particles having a size and size distribution similar to that of conventional hydraulic cements. For example, preferably no particles in the input powder are greater than about 75 μm, more preferably about 50 μm. Preferably no more than about 10 to 15% by weight of the input particles have a size less than about 5 μm. The average input particle size by weight is preferably in the range of about 10 to 50 μm, more preferably about 20 to 40 μm. When the finely divided powder of aluminates is allowed to set, preferably without calcium sulfate components or calcium oxide or calcium hydroxide present, it is believed that hydration products are first formed as an outer layer about the fine powder particles. At about the time of final set, the mixture then broken into particles, subsequent drying slows further hydration and assists in localizing hydration in an outer layer while leaving the inner core substantially unhydrated. Drying may be carried out positively as by leaving the particles in an open tray exposed to ambient air for a period of time preferably about 24 hours or by heating for a shorter period of time. Drying may also occur merely in the course of exposure to air as in processes of crushing followed by grinding and/or size classification and separation.

In the setting process it is believed that the input, fine powder particles each comprising a core with a coating thereabout may come to clump together into larger clumps and clusters and/or to merge with other particles having coatings about one or more cores of substantially unhydrated material. The product is therefore mechanically broken by crushing and/or grinding to reduce the product to smaller clusters and clumps preferably with the maximum size of the resultant powder particles about 300 μm, more preferably 150 μm, and preferably with particles greater than about 75 μm.

Preferred H-HAC particles may be prepared by forming a mixture of HAC and water and allowing the mixture to at least partially set. This step of mixing the HAC with water and letting it set is referred to as "prehydration". It is preferred that the mixture be allowed to set for a time at least equal to the final set time. The length of time the mixture is allowed to set is the "prehydration age". After prehydration the mixture is as necessary mechanically broken into particles, dried, ground and if desired size classified.

An expanding component of the present invention is formed by mixing the alumina-bearing particles of the present invention with a form of calcium sulfate. The calcium sulfate may be anhydrous ($CaSO_4$), the hemihydrate (plaster of Paris, a.k.a "quick set" or "moulding" plaster, i.e. $CaSO_4 \cdot 1/2H_2O$) or the dihydrate (gypsum, i.e. $Ca_2SO_4 \cdot 2H_2O$). The expanding component also preferably contains lime, the major component of which may either be calcium oxide or calcium hydroxide. Lime is only optionally added since Portland cement, with which the expanding component is mixed, may contain sufficient lime to allow the formation of ettringite.

The ratio of alumina-bearing particles to calcium sulfate in the expanding component is preferably from about 0.5:1 to about 4:1 by weight. When lime is added, the ratio of alumina-bearing particles to lime is preferably from about 4:1 to about 15:1 by weight, more preferably about 8:1.

An expansive component containing the alumina-bearing particles of the present invention may be combined with Portland cement to form an expansive cement. Such an expansive cement may either be one which expands during the curing process or one which does not expand but compensates for shrinkage of the cement during the curing process.

The preferred weight ratio of Portland cement to expanding component in the expansive cement of the present invention is preferably in the range of from about 1:1 to about 4:1. More preferably, the ratio of Portland cement to expanding component is from about 1.5:1 to about 2:1.

The expansive cement of the present invention may include a super-plasticizer, which improves the workability of concrete considerably without seriously affecting the expansion properties adversely. Preferred super-plasticizers are condensed naphthalene sulfonates. One such super-plasticizer is sold under the trade mark LOMAR-D, which is a naphthalene sulfonate condensate powdered superplasticizer. The weight ratio of the expanding component to superplasticizer in the expansive cement of the present invention is preferably about 10:1 to about 50:1, and more preferably 30:1 to 35:1.

In one aspect, the present invention provides a cement component comprising particles, each of said particles comprising: (a) an inner core comprising substantially unhydrated aluminates of hydraulic cement with the inner core comprising at at least about 30% alumina by weight; and (b) an outer coating which resists penetration of water into the inner core.

In another aspect, the present invention provides a partially hydrated high alumina cement powder comprising coated particles, each of said particles comprising: (a) an inner core comprising substantially unhydrated aluminates of hydraulic cement; and (b) an outer coating comprising hydration products of the inner core.

In yet another aspect, the present invention provides a cement composition, comprising: (a) a Portland cement component; and (b) an expanding component, comprising: (i) a partially hydrated alumina cement powder comprising coated particles, said particles comprising an inner core comprising substantially unhydrated aluminates of hydraulic cement and an outer coating which delays reaction between the aluminates of the core of the particles and other materials in the cement composition; and (ii) a calcium sulfate substance selected from anhydrous calcium sulfate, hemihydrate calcium sulfate and dihydrate calcium sulfate.

In yet another aspect, the present invention provides a method for preparing a partially hydrated high alumina cement powder, comprising the steps of: (a) forming a mixture of water and a finely divided powder of substantially unhydrated aluminates of hydraulic cement; (b) allowing the mixture of finely divided powder and water to set; (c) mechanically breaking the product of step (b) into particles; and (d) at least partially drying the particles.

In yet another aspect, the present invention provides a cement composition formed by mixing: (a) a Portland cement component; and (b) an expanding component, comprising: (i) a partially hydrated high alumina cement powder consisting of coated particles, said particles consisting of an inner core consisting of unhydrated high alumina cement and an outer coating consisting of hydration products of high alumina cement, said coating delaying reaction between the high alumina cement of the core of the particles and other materials in the cement composition; and (ii) a calcium sulfate substance selected from anhydrous calcium sulfate, hemihydrate calcium sulfate and dihydrate calcium sulfate; said partially hydrated high alumina cement powder being formed independently and prior to mixing with the remainder of the composition.

In yet another aspect, the present invention provides a cement composition formed by mixing: (a) a Portland cement component; (b) a partially hydrated high alumina cement powder; (c) a calcium sulfate substance selected from anhydrous, hemihydrate and dihydrate calcium sulphate, and (d) a calcium oxide substance selected from calcium oxide and calcium hydroxide; wherein said partially hydrated high alumina cement powder is formed independently and prior to mixing with the remainder of the composition by a process of: (i) forming a mixture consisting of water and unhydrated high alumina cement, the ratio of high alumina cement to water being from about 1:1 to about 4:1; (ii) allowing the mixture of high alumina cement and water to set; and (iii) mechanically reducing the product of step (ii) into a resultant powder.

BRIEF DESCRIPTION OF THE DRAWINGS

Further aspects and advantages of the present invention will become apparent from the following description, taken together with the accompanying drawings, in which:

FIGS. 16 to 20 are graphs showing X-ray diffraction patterns of expansive cement paste samples at different times in the first 60 minutes of hydration, for cement paste samples M-1, M-2, M-3, M-4 and M-5, respectively.

FIGS. 21 to 23 are graphs showing X-ray diffraction patterns of expansive cement paste samples at day 1, day 3 and day 28, respectively.

DESCRIPTION OF THE PREFERRED EMBODIMENTS

Preparation of H-HAC

Figure 1:
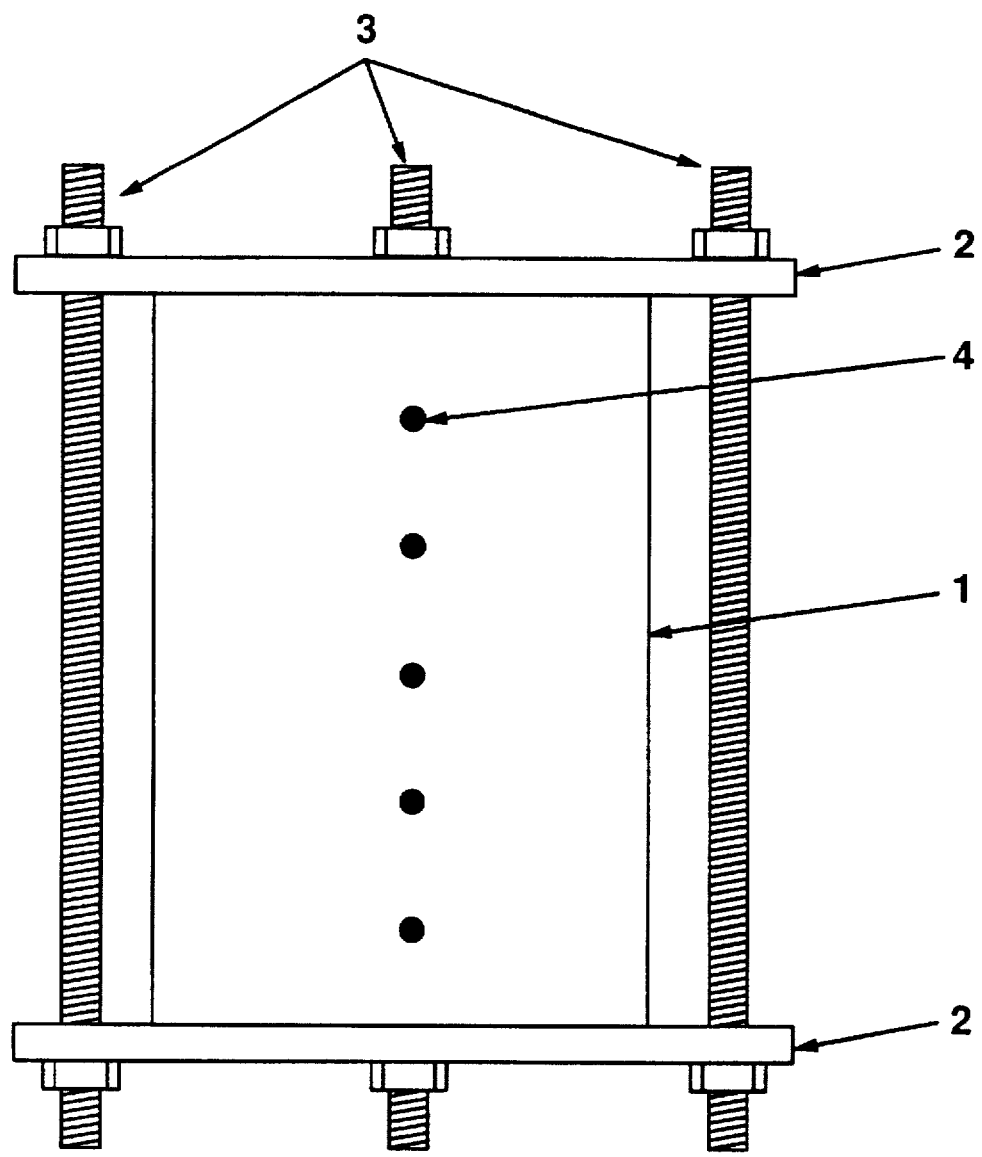
FIG. 1 shows a schematic elevation view of a steel tube mould used for testing of expansive concrete paste and expansive concrete.

Preferred forms of the alumina-bearing particles of the present invention and the "prehydration" process for their preparation are now described.

In a preferred embodiment of the present invention, HAC powder is partially hydrated, mixed with water to form H-HAC and then, as necessary, mechanically broken into particles.

For example, HAC, such as that sold under the trade mark CIMENT FONDU by Canada Cement Lafarge Limited, is mixed with water using a water/cement weight ratio equal to 0.5. The HAC is prehydrated for a period of from 30 minutes before final set to about 7 days, during which time it attains a hardness ranging from that similar to wet sand to that of a hardened mass.

The HAC is preferably prehydrated for a period at least equal to the final set time. Beyond 24 hours, the length of prehydration age does not seem to have any substantial effect on the flow and setting behaviour of the expansive cement paste. The most preferred prehydration age is from 4 to 24 hours.

After prehydration, the H-HAC is preferably crushed and then preferably dried at room temperature for about 24 hours. It is then preferably ground into a fine powder having particles ranging in size from about 75 um to 300 um. Preferred particle size is from 75 um to 150 um. Grinding is not required when the H-HAC has been prehydrated for shorter periods of time, for example a period of 30 minutes less than final set time.

The resulting powdered H-HAC may then be combined with calcium sulfate (anhydrous, hemihydrate or dihydrate), and preferably also with lime (CaO or $Ca(OH)_2$) to form the expanding component. In one preferred example, the weight ratio of powdered H-HAC:calcium sulfate hemihydrate:hydrated lime in the expanding component is about 9:4:1.

The expanding component containing H-HAC can be combined with Portland cement to form an expansive cement. In one preferred example, the weight ratio of Portland cement to expanding component is about 1.5:1.

Expansive concrete can be formed from the expansive cement of the present invention by combining the expansive cement with water and aggregate in the same manner as ordinary Portland cement. In one preferred example, the weight ratio of expansive cement:stone:sand:water was about 5:8:7:2.

A small amount of superplasticizer may also be added to expansive concrete of the present invention to improve workability and minimize the amount of water needed. In one preferred example, the weight ratio of expansive cement to superplasticizer was about 130:1.

HAC cement powder is known to be a finely divided powder of particles, for example with an average particle size smaller than about 50 μm. Preferably the HAC powder used, as is typical, may have no particles greater than about 75 μm, more preferably 50 μm. Preferably no more than about 10 to 15% by weight of the particles have a size which is less than about 5 μm. The average particle size is preferably in the range of about 10 to 50 μm or about 20 to 40 μm.

The mechanism by which the expanding component containing H-HAC improves the setting behaviour of expansive cements is not well understood. According to the "Through Solution Theory", discussed in Mehta, "Effect of Lime on Hydration of Pastes Containing Gypsum and Calcium Aluminates or Calcium Sulfoaluminate", Hour. Amer. Ceramic Soc., Vol. 56, No. 6, 1973, p. 315 it is believed that the rate of ettringite formation is proportional to the concentration of $Al^{3+}$ ions in the concrete pore solution. As a result of the prehydration of particles of HAC, a coating or cladding of hydration products of HAC is formed on the surface of the HAC particles, resulting in the defined H-HAC particles. When the H-HAC particles are subsequently used in an expansive cement and mixed with water, it is believed that this cladding, on one hand, may resist water penetration into the unhydrated cores, and in any event on the other hand may reduce the ability of $Al^{3+}$ ions to disperse from the cladding. A relatively long time period is needed for the reactant $Al^{3+}$ ions to reach the saturated concentration under which the ettringite is crystallized. This slow accumulation of $Al^{3+}$ ions from the H-HAC particles allows the expansive cement paste to have the desired delayed setting behaviour.

Particle size plays an important role in controlling the degree and rate of expansion and the set time of the H-HAC-containing expansive cement. Smaller particles have a proportionally higher surface area per unit weight than larger particles. This higher surface area is believed to either increase the rate of dispersion of $Al^{3+}$ particles or increase the surface area from which the ettringite grows, or both. Therefore, the smaller the particle size, the faster the rate of ettringite formation and the shorter the set time. Accordingly, selection of appropriate fineness of H-HAC is not only important in controlling the quality of expansive cement, but also is a method of adjusting the rate of expansion, the ultimate value of expansion, and the set time.

The length of set time and the degree and rate of expansion may also be controlled by adjusting the amount of H-HAC in the expanding component and the amount of expanding component in the expansive cement. The higher the proportion of expanding component in the expansive cement, the higher the degree and rate of expansion and the shorter the set time.

Tests were conducted to compare expansive cement pastes and concretes according to the present invention including H-HAC powders with similar expansive cement pastes and concrete, including HAC powders rather than H-HAC.

Commercially available materials were used to prepare sample expansive cement pastes and concretes for the tests. These test materials are listed below with the name by which they are referred to hereinafter in the tables being shown in quotations or brackets:

1. as ordinary "Portland cement (OPC)", namely ASTM Type 1 or CSA Type 10 Portland cement;
2. as the expanding component, a mixture of CIMENT FONDU a high alumina cement sold by Canada Cement Lafarge Limited (HAC), quick setting plaster being calcium sulfate hemihydrate (quick set plaster) and hydrated finishing lime being calcium hydroxide (hydrated lime);
3. admixtures including the commercial retardant sold under the trade mark "DELVO", the retarder "sodium citrate", the superplasticizer sold under the trade mark "LOMAR-D", and "fly ash";

4. aggregates including sand and crushed limestone (stone) with a maximum size of 20 mm; and
5. water.

For the tests H-HAC powders were made from CIMENT FONDU (HAC) by the following process:

1. mixing CIMENT FONDU (HAC) with water using a water/cement weight ratio of 0.5;
2. casting it in 100×200 mm plastic cylinder mould;
3. letting the mixture set for one of the designated "prehydration ages";
4. after prehydration for the designated prehydration age, as necessary to particulize, crushing the H-HAC;
5. drying the H-HAC at room temperature for 24 hours;
6. grinding the H-HAC into a fine powder; and
7. separating it into different sizes by sieving.

Six representative test H-HAC powders were prepared by this process. These six powders are described Table 1 which sets out for each sample the "Prehydration Age", the particle size and the sample number of either the "cement paste" or "concrete" in which the H-HAC was included. The prehydration ages were chosen to be a minimum of 30 minutes before final set for powder B; 1.5 hour after final set for powder C; 1 day after mixing with water for powders A, E and F; and 7 days after mixing with water for powder D. For powder B with a prehydration age of 30 minutes before final set there was no crushing or grinding or size separation as the resultant H-HAC was a particulate material after removal from the mould. For the powder other than sample B, sieving separation was selected to provide powders with H-HAC particles in the ranges of either less than 75 µm, 75 µm to 150 µm or 150-300 µm.

Cement Paste Samples—EP Series

Cement paste samples were prepared from the test materials utilizing either the preferred H-HAC powders or the Cement Fondue (HAC) powder. The composition of fourteen of these cement paste samples are shown in Table 2 in which each component is indicated by mass in grams.

Each cement paste sample comprises Portland Cement, an expanding component, water and optional admixtures. The expanding component comprises quick set plaster and hydrated lime plus either CIMENT FONDU HAC powder or one of the H-HAC powders. A small amount of superplasticizer, Lomar D was used in each H-HAC cement paste in Table 2 as it was appreciated that larger water to cement ratios (w/c) would be needed to achieve preferred workable pastes.

The components of each cement paste were mixed in accordance with the "Type of Mixing Process" fully described in Table 5.

Regarding Table 2, samples EP1, EP2, EP37, EP38, and EP40 to 43 inclusive are the HAC cement paste samples prepared with HAC powder. Samples EP49 to EP54 inclusive are the H-HAC cement paste samples prepared with the various H-HAC powders.

Cement Pastes—Flowability Tests

Tests were conducted on the cement pastes of Table 2 to determine the loss of flowability with time after adding the expansive components.

A flow table in accordance with ASTM C-230-68 was used to determine the change of flowability of the cement pastes. The method employed did not exactly follow this ASTM Standard, because the flow of the cement pastes with admixtures usually exceeded the range of the table. In most cases, the cement paste flowed by gravity without preforming any drops. The results are graphically shown in FIGS. 2 and 4 for HAC cement pastes and FIGS. 6 and 8 for H-HAC cement pastes. In FIGS. 2, 4, 6 and 8, the percent flow is shown as measured at various times in minutes after adding the expansive component to the cement pastes.

Figure 2:
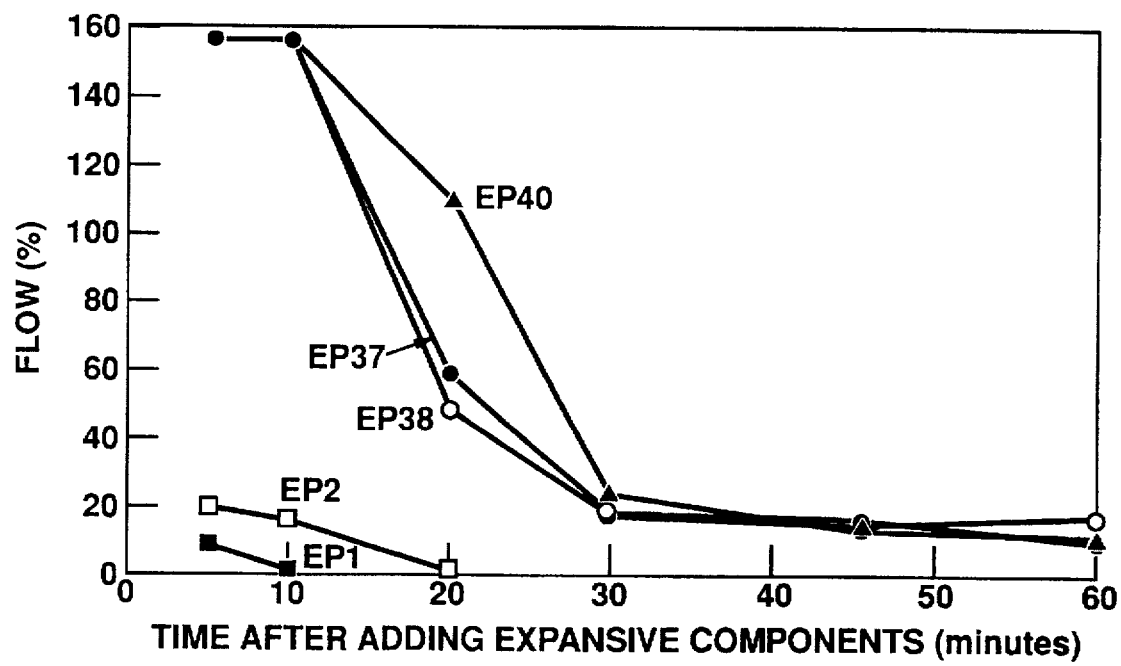
FIGS. 2, 4, 6 and 8 are graphs showing the loss of flowability of expansive cement paste samples with time, with FIGS. 2 and 4 showing HAC expansive cement pastes and FIG. 6 and 8 showing H-HAC expansive cement pastes.
Figure 4:
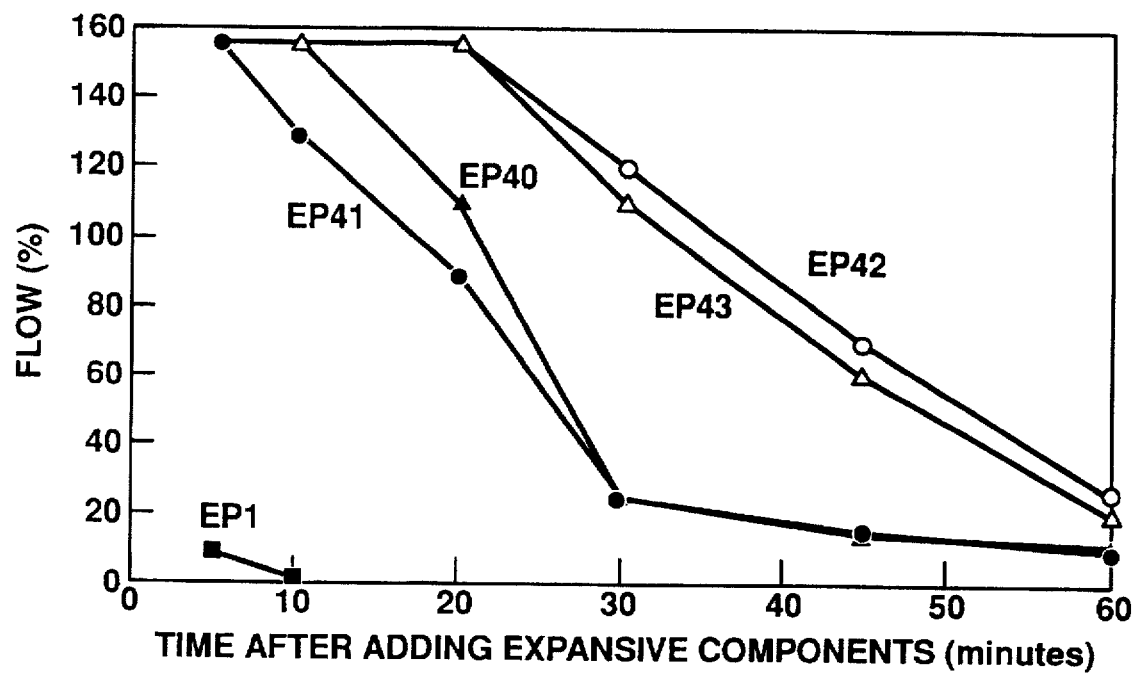
Figure 6:
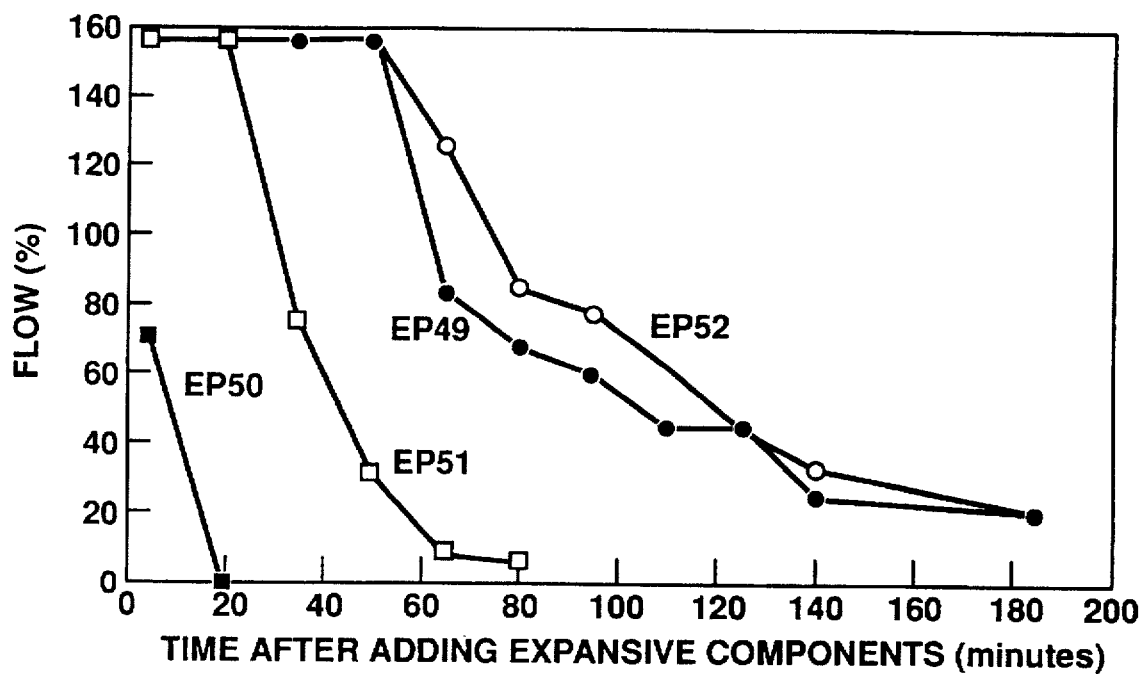
Figure 8:
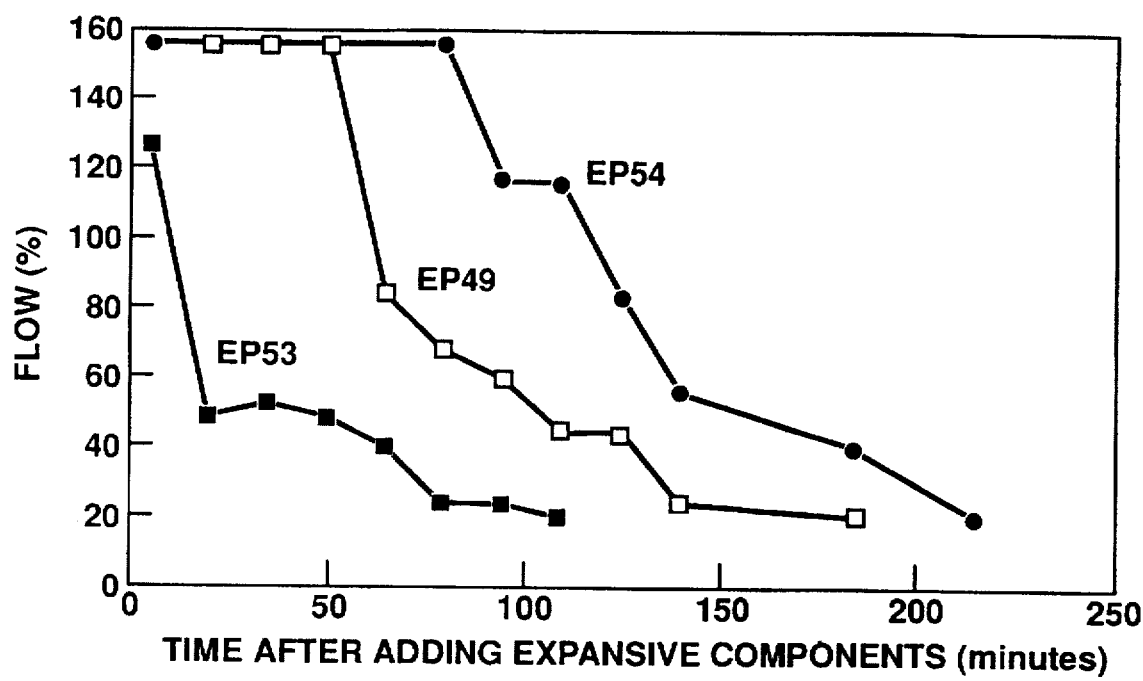

FIGS. 2 and 4 show eight HAC sample cement pastes with a horizontal axis of 60 minutes and are to be contrasted with FIGS. 6 and 8 showing the H-HAC sample cement pastes with a horizontal axis of 200 to 250 minutes. The H-HAC sample cements other than EP50 have improved loss of flowability compared to the HAC sample cement pastes. H-HAC sample cement paste EP50 had the shortest prehydration age of 30 minutes before final set and was comparable in loss of flowability with single step mixed HAC samples E1 and E2. FIG. 6 shows that the flow percent increases with prehydration age for the H-HAC pastes with the prehydration age increasing from EP50 to EP51 to EP49 to EP52. FIG. 8 shows that the flow percent increases for the H-HAC pastes with increase in particle size in that H-HAC sample EP53 has particles of less than 75 µm; H-HAC sample EP49 has particles of 75-150 µm and H-HAC sample EP54 has particles of 150-300 µm.

Cement Paste—Initial and Final Set Tests

Tests were conducted on the cement pastes of Table 2 to determine the initial and final setting time by the method of ASTM C 807-89. In this test, after flow decreased with time to less than 10%, the paste was compacted in a PVC cone, the surface was finished and the initial and final setting times were measured in minutes by a Vicat apparatus. The results are shown in Table 4.

All of the H-HAC sample cement pastes E49 and E51 to E54 had substantially greater initial and final set times than the HAC sample cement pastes EP40 to EP43, with the exception of H-HAC sample cement paste EP50. H-HAC sample cement paste EP50 had a prehydration age of less than the final set time. H-HAC sample cement paste EP51 had the next lowest set times and was the sample with the next lowest prehydration age of 1.5 hours after final set. A comparison of H-HAC samples EP49, EP53 and EP54, each of which had prehydration ages of 1 day and with H-HAC sample EP52 having a prehydration age of 7 days suggests that after 24 hours, the prehydration age of H-HAC cement paste does not appear to have a substantial effect on the setting behaviour of the paste.

Cement Paste—Free Expansion Tests

Tests were conducted on the cement pastes of Table 2 to determine the free expansion with time. In these tests, when the flow of the paste had decreased to less than 10%, two expansion specimens were cast in steel prism moulds to produce 25×25×125 mm (1×1×5 inches) specimens with expansion studs at the ends providing a gauge length of (125 mm/5 in.). The specimens were cured initially in a sealed plastic box under the relative humidity of 100% and temperatures of about 23±3° C. (74±5° F.). Some specimens were demoulded after 24 hours and others just after final setting. Initial lengths of the specimens were measured immediately after demoulding. After 24 hours drying in the sealed boxes, the specimens were set in water. The expansion was read once a day until the specimens cracked or the lengths of the specimens became constant.

The results are shown in FIGS. 3, 5, 7 and 9 as graphs showing free expansion as a percentage of the initial lengths versus the number of days after mixing with water. The term "break" shown in FIGS. 3, 5, 7 and 9 is used at the end of an expansion curve to indicate the specimen is cracked to the extent that further measurements would not be meaningful.

Figure 7:
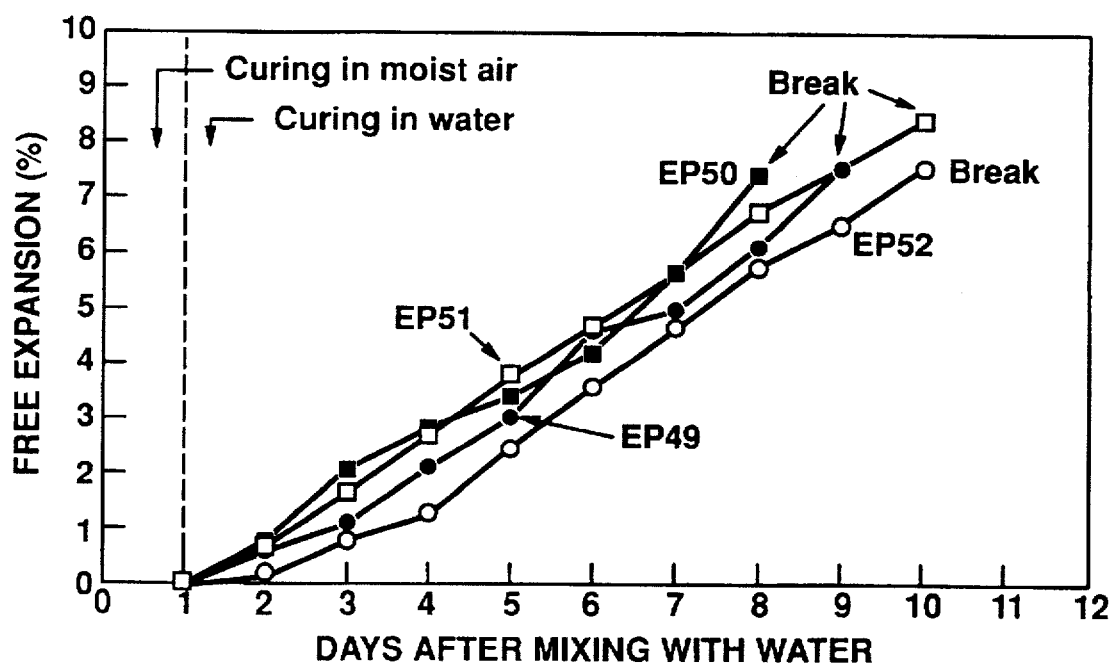
Figure 9:
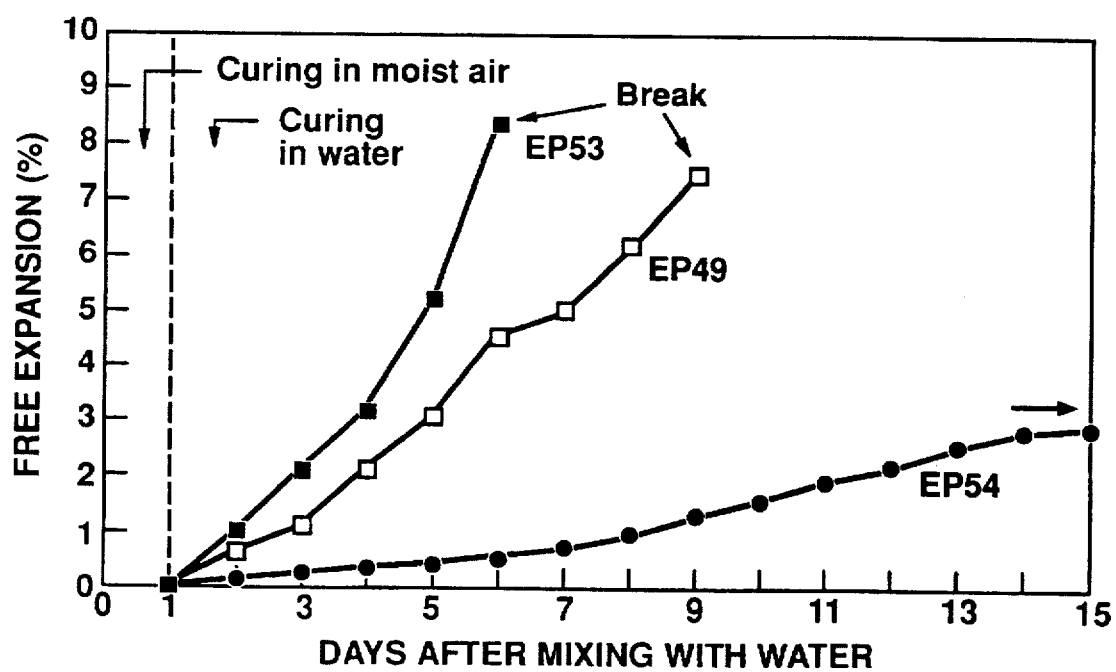

The expansion of the H-HAC cement pastes are shown in FIGS. 7 and 9 to be somewhat comparable with the expansion of the HAC cement pastes EP1 without any admixtures. HAC cement paste EP1 without any adjunctives had the greatest expansion. HAC cement pastes EP37, EP38, EP40 and EP41 had low expansion which is believed to be due to the presence of substantial admixtures.

Figure 3:
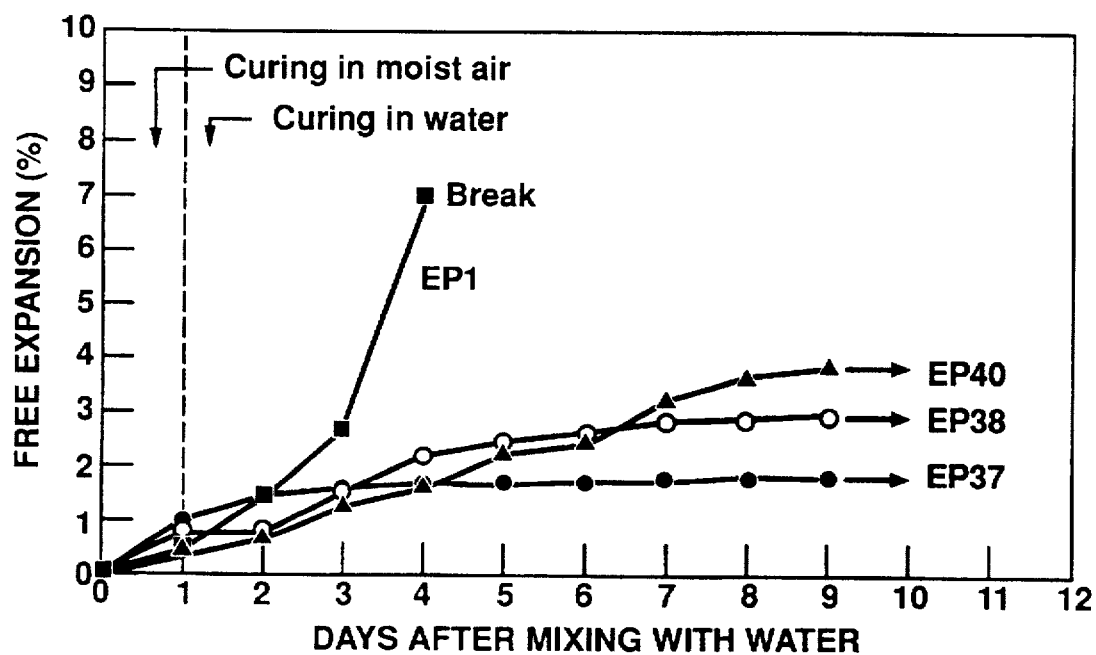
FIGS. 3, 5, 7 and 9 are graphs showing the free expansion of expansive cement paste samples with time, with FIGS. 3 and 5 showing HAC expansive cement pastes and FIGS. 7 and 9 showing H-HAC expansive cement pastes.
Figure 5:
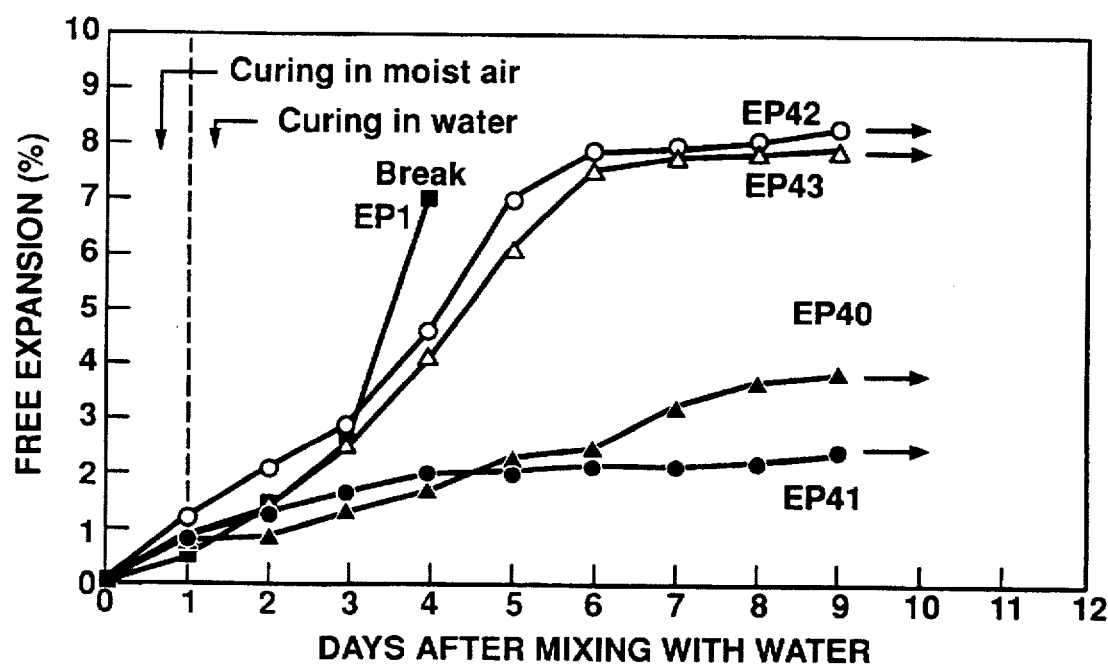

The effects of prehydration age of the H-HAC powders on flow and free expansion of the H-HAC cement paste samples are shown in FIGS. 6 and 7. The initial and final set times of H-HAC cement paste samples are compared with HAC cement paste samples in Table 4. The H-HAC particle size in H-HAC cement paste samples EP49, EP51 and EP52 varied between 75 μm and 150 μm. The results suggest that a prehydration age at least equal to final set time is preferred to achieve satisfactory flow characteristics of the H-HAC cement pastes. Beyond 24 hours, the prehydration age of H-HAC does not seem to have substantial effect on the flow and setting behaviour of the H-HAC cement pastes. Even with prehydration age of 1.5 hours longer than final set, initial and final set times of approximately 6 hours were recorded for the H-HAC paste samples. The effect of prehydration age of H-HAC on free expansion of the H-HAC cement paste is minimal as shown in FIG. 7. Compared to HAC-type expansive cement pastes as shown in FIGS. 3 and 5 the expansion characteristics of H-HAC cement pastes as shown in FIGS. 7 and 9 are significantly better with respect to the total expansion and the delay in expansion. Since the use of admixtures in the H-HAC cement paste samples is minimal, the loss of measurable expansion is believed to have been minimized.

The effects of particle size of the H-HAC powders on flowability and expansion of the H-HAC cement pastes are shown in FIGS. 8 and 9. The prehydration age of H-HAC in HHAC cement pastes EP49, EP53 and EP54 was 24 hours. As expected, reduced particle size results in faster initial reaction. Reduced particle size of H-HAC gave the H-HAC cement pastes a lower flow, a larger flow loss with time and a faster set. When the particle size decreased from 75–150 μm to less than 75 μm, the expansion of the H-HAC cement paste developed earlier. The ultimate amount of expansion was, however, very similar with both H-HAC samples EP53 and EP49. With an increase in the particle size from 75–150 for EP49 to 150–300 μm for EP54, the development of expansion was greatly delayed and, as well, the ultimate expansion appears to have been reduced. For the H-HAC cement pastes under consideration, a particle size of H-HAC in the range of 75–150 μm appears to be preferred.

Concrete Samples—E Series

Concrete samples were prepared from the test materials utilizing either the prepared H-HAC powders of Table 1a or the CIMENT FONDU (HAC). The composition and mixing processes of five concrete samples are shown in the Table 3 of which expansive concrete sample E11 is made with H-HAC by one stage mixing and samples E6 to E9 inclusive are made with CIMENT FONDU (HAC) by various mixing processes indicated and fully defined in Table 5. For H-HAC cement sample E11, a small amount of a superplasticizer LOMAR D was used as it was appreciated that larger water to cement ratios (W/C) would be needed otherwise to achieve preferably workable concrete.

Concrete Sample—Slump Test

Figure 10:
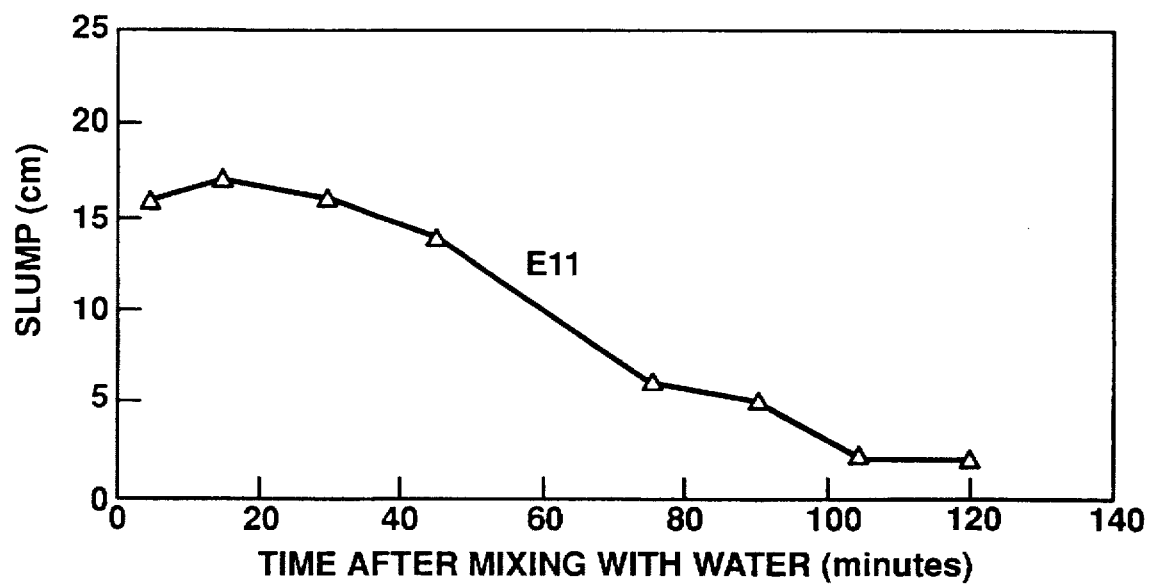
FIG. 10 comprises a graph showing the slump loss of a H-HAC expansive concrete sample.

Slump values were measured for H-HAC cement sample E11 over two hours as shown in FIG. 10. The behaviour of sample E11 was very similar to that of normal Portland cement concrete including similar amounts of superplasticizers. For sample E11, initial slump of approximately 160 mm (6.2 inches) maintained for about 30 minutes and at 60 minutes the slump was still about 100 mm (4 inches).

Concrete Samples—Compressive Strength and Friction Stress Tests

To simulate the actual stress state with three dimensional restraint, a set of steel tube moulds for casting and curing expansive cement pastes/concrete was designed, as shown in FIG. 1. The lateral expansion of expansive concrete was restrained by the steel tube 1 and the longitudinal expansion was restrained by two steel end plates 2 tightly held in place by three 8 mm diameter threaded rods 3. The tube 1 has a 100 mm inner diameter and 200 mm length with a 6 mm thick wall. Twenty holes 4 of 5 mm diameter were made symmetrically in four columns to allow supply of water during hydration. The expansive concrete was cured in the mould in air at 100% relative humidity and about 25° C. for 24 hours after casting and then placed in 23° C. water. At designated ages, steel plates 2 were removed and the expansive concrete cylinder was squeezed out using a universal testing machine. During the demoulding process the friction stress between the expansive concrete and the inside of the steel tube could be measured from the maximum load required to remove the expansive concrete cylinder from the tube. The compressive strength was obtained from testing the squeezed-out specimens.

Figure 11:
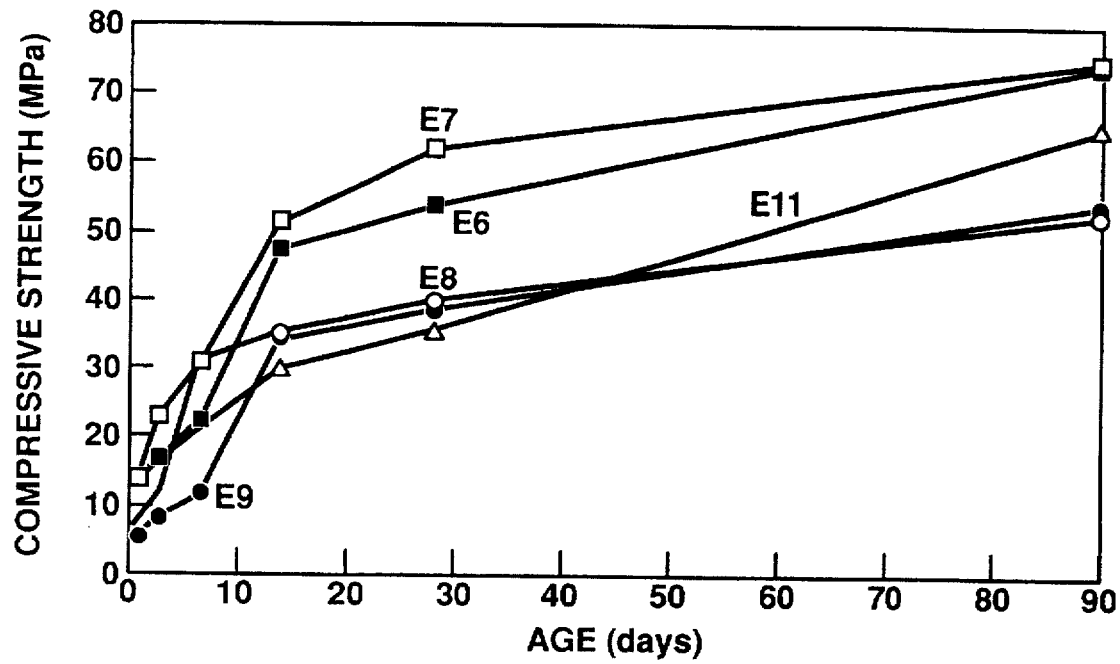
FIG. 11 is a graph showing the development of compressive strength of both HAC and H-HAC expansive concrete samples.

FIG. 11 illustrates the development of compressive strength of the expansive concrete samples over a period of 90 days. The strength of HAC concrete samples E6 and E7, both containing no fly ash, was the highest mainly because of the lower water:cement ratio used. The addition of fly ash and a higher proportion of water to HAC concrete samples E8 and E9 to improve workability of the concrete resulted in a reduction in strength. FIG. 11 shows the compressive strength for unconfined expansive concrete. In actual field conditions, expansive concrete is typically confined laterally when subjected to axial stress and will, therefore, display much higher strength.

The H-HAC concrete sample E11 displayed lower strength than comparable HAC sample E6 at an early age, but at later stages the two concretes had similar strength values. Compared to normal concrete made merely with normal Portland cement, the strength development of all the expansive concrete samples shown in FIG. 11 is delayed by several days. This effect is pronounced in H-HAC concrete sample E11.

Figure 15:
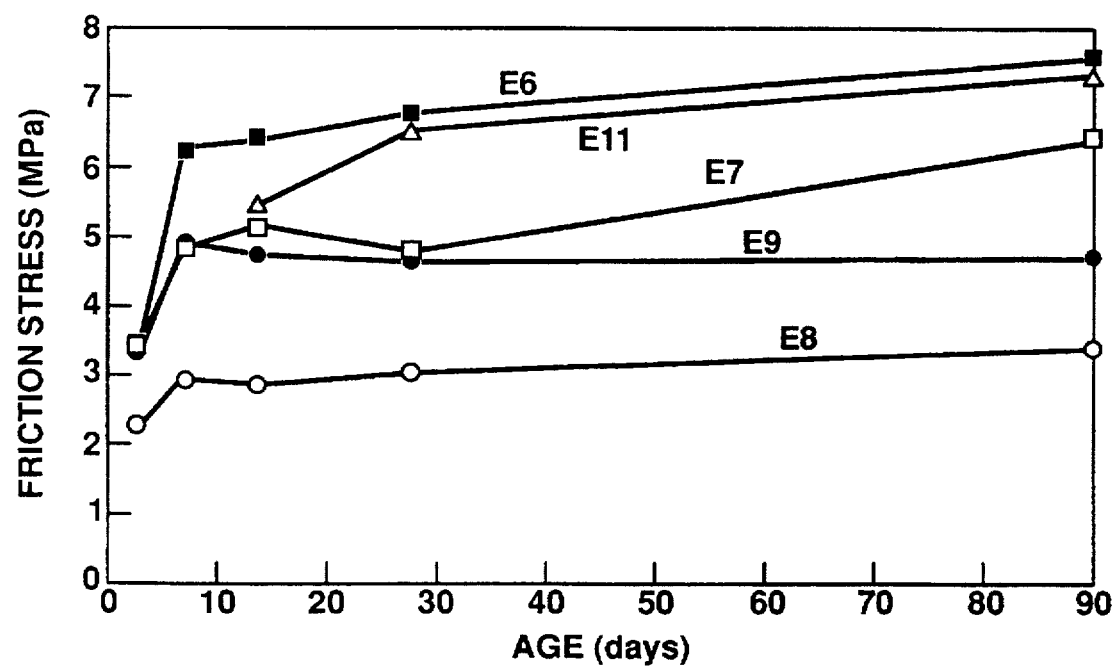
FIG. 15 is a graph showing the friction stress of both HAC and H-HAC expansive concrete samples.
Figure 24:
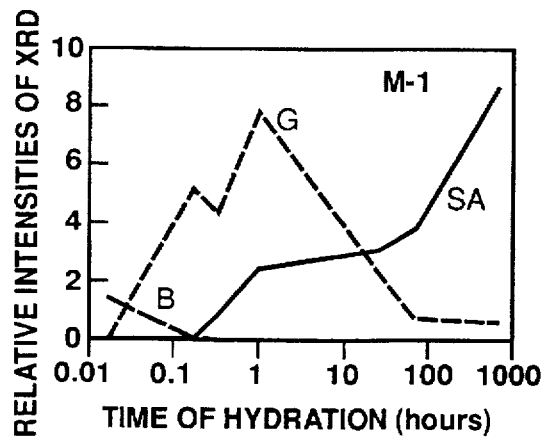
FIGS. 24 to 28 are graphs showing relative intensities of sulphoaluminate, gypsum and hemihydrate of expansive cement paste samples at different times for samples M-1 to M-5, respectively.
Figure 25:
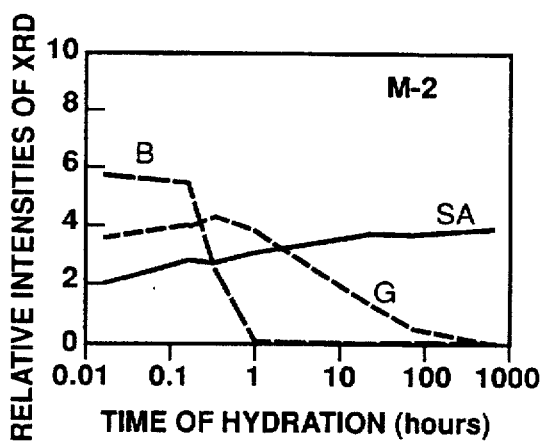
Figure 26:
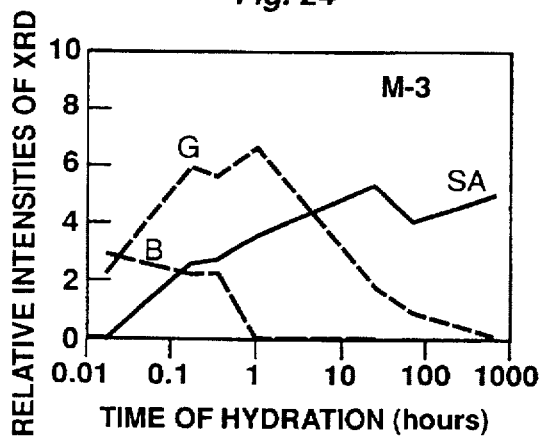
Figure 27:
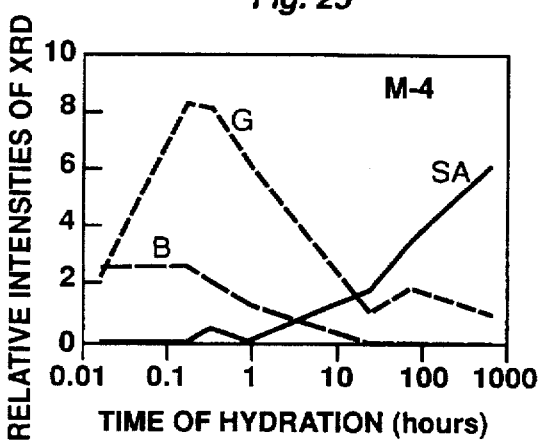
Figure 28:
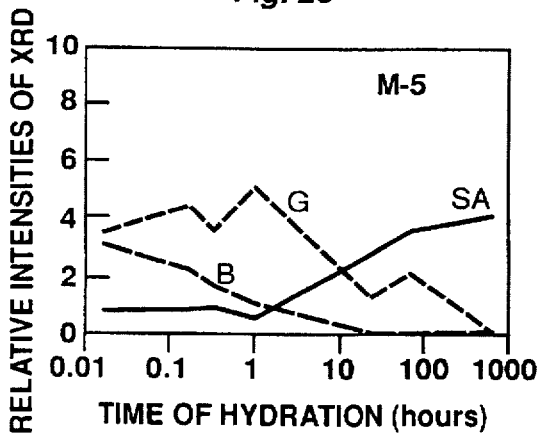

FIG. 15 shows the frictional stress in MPa as measured at different times for each concrete sample. H-HAC concrete sample E11 had friction stresses comparably as large to those for HAC cement sample E6 without admixtures.

Concrete Samples—Free Expansion Tests

Expansive concrete was cast in PVC cylinder moulds 100 mm in diameter, 200 mm long with 3 mm thick walls with expansion studs embedded at the ends. After curing for 24 hours in moist air, the specimens were demoulded. The original length of a specimen was obtained by averaging four measured lengths of concrete cylinder on symmetric sides. The initial length including two targets was measured immediately after demoulding, and then specimens were cured in water. The length changes were determined daily.

Figure 12:
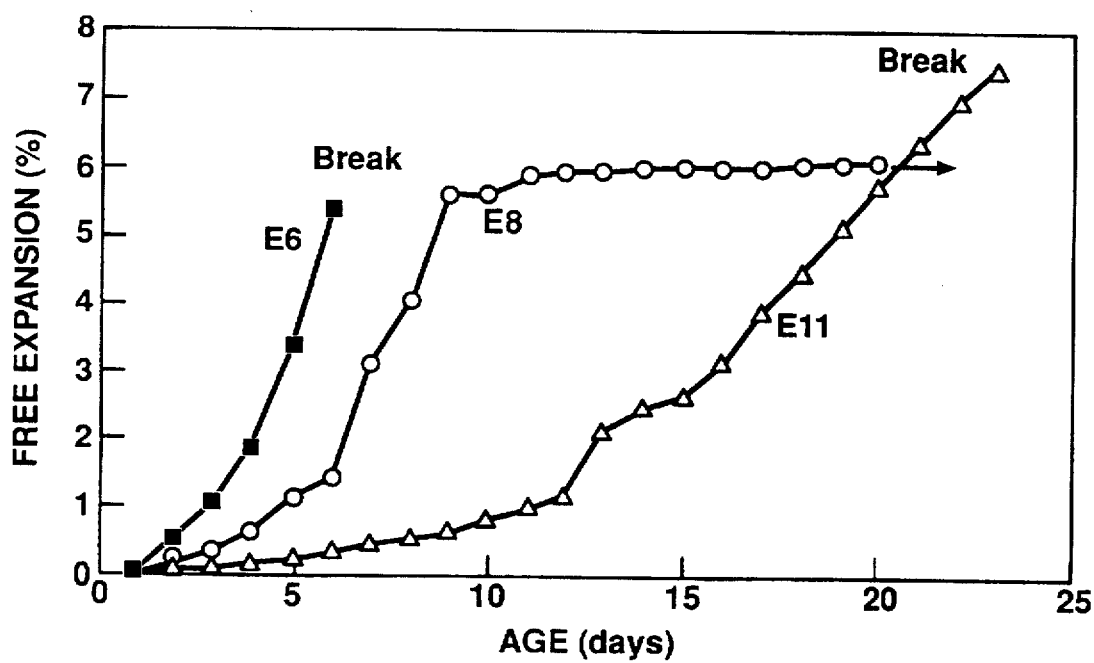
FIG. 12 is a graph showing the free expansion of both HAC and H-HAC expansive concrete samples.

The changes in linear free expansion with time of samples E6, E8 and E11 are shown in FIG. 12. The addition of fly ash to HAC sample E8 delayed expansion by about 2 days over HAC sample E6. However, the total free expansion of HAC samples E6 and E8 are comparable.

As shown in FIG. 12, the H-HAC concrete sample E11 had a delayed development of expansion by about 9 to 10 days. The rate of expansion of H-HAC concrete sample E11 at about 12 days is similar to that of HAC concrete sample E6 at about 3 days. The total measured free expansion of H-HAC concrete sample E11 was slightly higher than that of HAC samples E6 and E8. However, it should be noted that, due to extensive cracking of the specimens, the free expansion measurements do not necessarily reflect the true quantitative effects of different parameters.

Concrete Samples—Two Dimensional Restrained Expansion Tests

The expansive concrete specimens for two dimensional restrained expansion tests were cast in PVC tubes with 3 mm thick walls, 120 mm long and 100 mm inner diameter. Two expansion studs were installed in the centre at the ends. The initial length of a specimen was obtained by averaging four measured lengths of concrete cylinder on symmetric sides including tow targets after one-day of moist curing. Then the specimens with PVC tube moulds were stored in 23° C. water. The length changes were determined daily. In this test, the restraint was applied to the expansive concrete from the wall of PVC tube in the lateral direction. In the longitudinal direction the only restraint could have come from the friction between concrete and the PVC walls.

Figure 13:
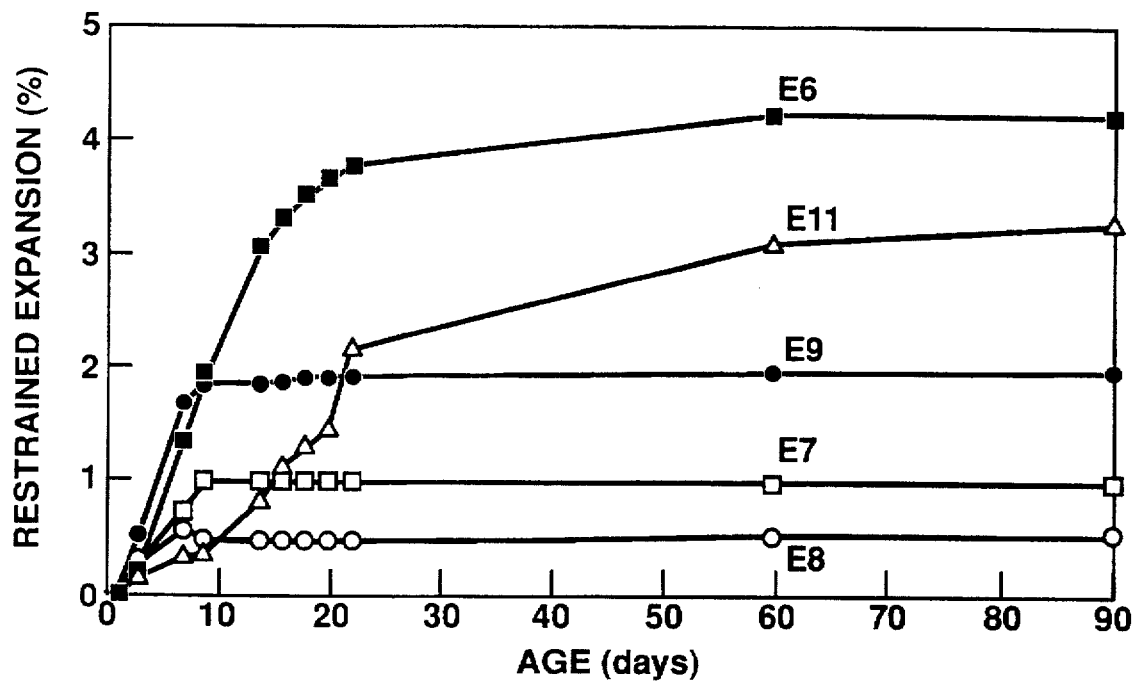
FIG. 13 is a graph showing the longitudinal expansion of laterally restrained HAC and H-HAC concrete samples.

FIG. 13 shows the results of this test as the percent restrained expansion versus time in days. H-HAC concrete sample E11 had expansion closest to that of HAC sample E6 without admixtures.

Concrete Samples—Expansion Pressure Tests

A test mould for measuring this parameter was designed similar to that shown in FIG. 1. A thin walled steel tube was used to provide lateral restraint and two end steel plates tightly installed by three 8 mm diameter threaded rods acted as longitudinal restraint. The expansive concrete specimen inside the tube was 150 mm in diameter and 300 mm long. The wall thickness of the tube was 3 mm. Several strain gauges were installed to measure the changes in lateral and longitudinal strains during concrete expansion. Each rod contained one strain gauge in the axial direction. The outer surface of each tube was instrumented with three strain gauges, one in the axial direction and two in the circumferential direction. The holes in the steel tubes were made for easy flow of water as mentioned above for the strength test specimens. One hour after casting the expansive concrete, initial strain readings were taken. The specimens were cured in air at 100% relative humidity and 25° C. for 24 hours, and then placed in 23° C. water. Readings were recorded every day for each specimen.

Figure 14:
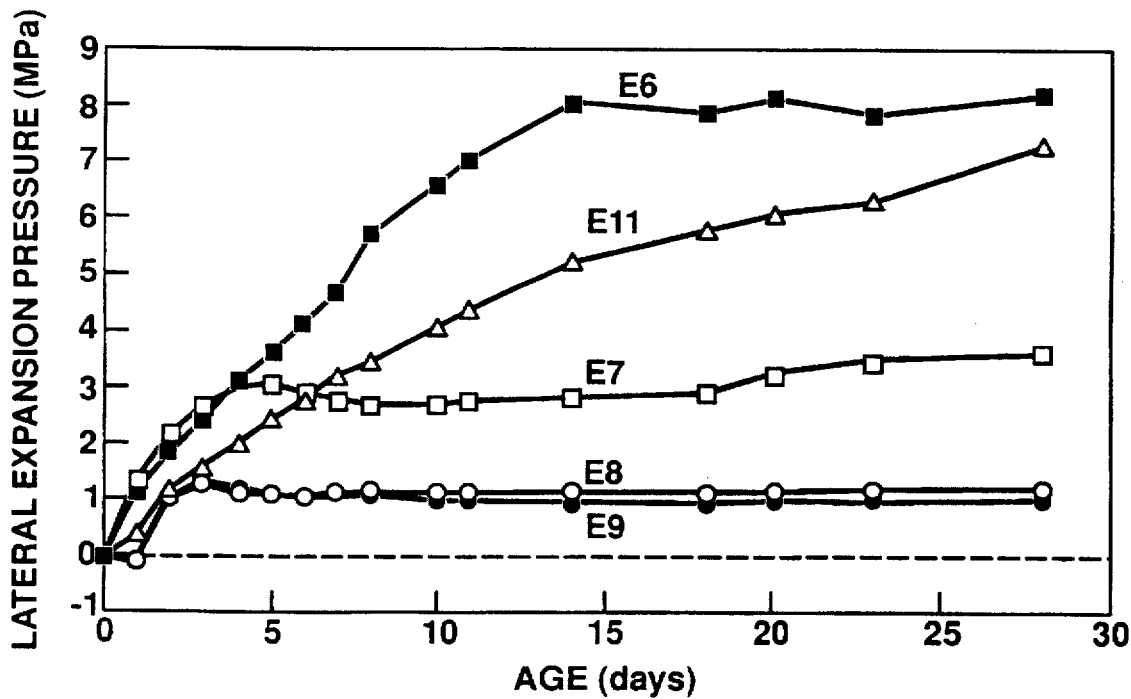
FIG. 14 is a graph showing the lateral expansion pressure curves of both HAC and H-HAC expansive concrete samples.

The test results are shown in FIG. 14 plotting the lateral expansion pressure in MPa versus time in days. Again H-HAC concrete sample E11 was comparable to HAC concrete sample E6 without admixtures.

Reference is made again to FIGS. 13, 14 and 15 respectively showing the variation with age of longitudinal expansion, the lateral expansion pressure, and the friction stress of the expansive concrete samples. HAC concrete sample E6 displayed the most expansion, the largest expansive pressure and the largest friction stress. The addition of admixtures to HAC concrete sample E7 greatly reduced its expansive potential, as is apparent in all three parameters measured in FIGS. 13 to 15. A comparison of HAC concrete samples E7 and E8 shows that an increase in the water to cement ratio and perhaps addition of fly ash reduce the expansive potential of the concrete.

It is obvious from FIGS. 13 to 15 that the gain in workability due to admixtures in the HAC expansive concrete is obtained at the expense of expansive potential. By comparing HAC concrete samples E8 and E9, it is apparent that increasing the amount of expanding component compensates somewhat for the loss of restrained expansion and friction stress without significant adverse effects on strength and workability, but the development of lateral expansion pressure is not improved.

FIGS. 13 to 15 show that H-HAC concrete sample E11 of the present invention compared quite favourably with HAC concrete sample E6. Although the restrained expansion of H-HAC concrete E11 is somewhat lower than that of HAC concrete E6, expansion pressure and friction stress in E6 and E11 are of reasonably similar magnitudes. Delay in the development of expansive pressure in H-HAC concrete E11 due to the use of H-HAC is beneficial in some applications, such as in drilled shafts.

Cement Pastes—M Series

Additional cement paste samples were prepared from the test materials utilizing either the preferred H-HAC powder A of Table 1 or the CIMENT FONDU (HAC) powder. The composition of five additional cement paste samples are shown in Table 6 in which each component is indicated by mass. In Table 6, Samples M-1, M-2 and M-3 are HAC cement paste samples while samples M-4 and M-5 are H-HAC cement paste samples.

Fresh Paste Samples

To measure the hydration process of expansive cement paste samples of Table 6 in the fresh state, two grams of solid materials were mixed continuously and uniformly with their relative proportion of water or water-admixture solution in a glass beaker at 23° C. The hydration periods were fixed at 1, 3, 5, 10, 20, 30 and 60 minutes. At the designated time, the hydration of the fresh paste was terminated by adding 30 ml of propanol, and then the samples were filtered in a funnel with qualitative filter paper (grade 601-25). After washing the sample by propanol three times on the filter paper, the remnant on the paper was dried in a vacuum dessicator with a negative pressure of 100 kPa for 48 hours. Then the sample was ground together in an agate mortar with 100% $CaF_2$ as an internal standard.

Figure 29:
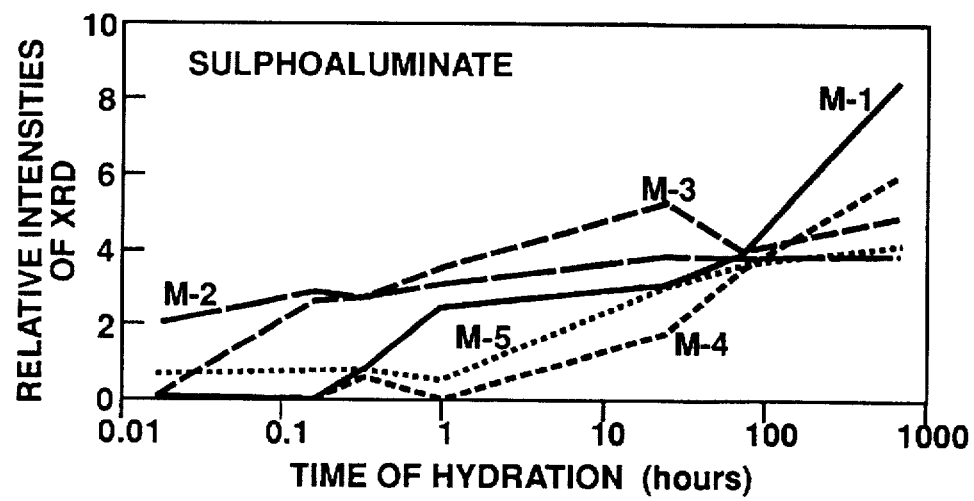
FIGS. 29 to 31 are graphs showing a comparison of the relative intensities of sulphoaluminate, gypsum and hemihydrate, respectively, for expansive cement paste samples.
Figure 30:
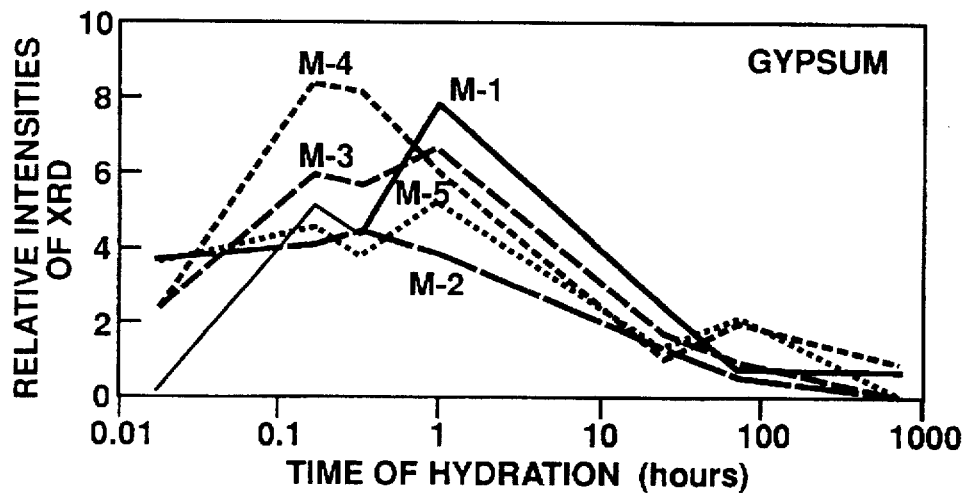
Figure 31:
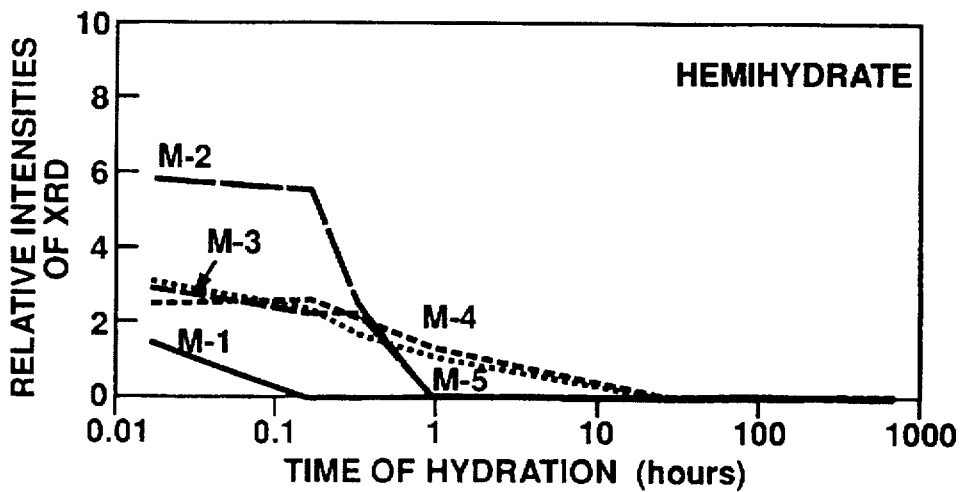

X-ray diffraction patterns of the five expansive fresh paste samples M-1 to M-5 during hydration in first 60 minutes are presented for each sample, respectively in FIGS. 16 to 20 and at three later ages in FIGS. 21 to 23, as measured with an X-ray diffractometer using Copper Kx radiation. In FIGS. 16 to 23, A represents $Al_2O_3$, B represents $CaSO_4 \cdot 1/2H_2O$, CH represents $Ca(OH)_2$, G represents gypsum, SA represents calcium sulphoaluminate, $C_2S$ represents $2CaO \cdot SiO_2$ and $C_3S$ represents $3CaO \cdot SiO_2$. Calculated from these FIGS. 21 to 23, the relative intensities of three designated minerals, Gypsum (G), Hemihydrate (B) and calcium sulphoaluminate (SA), are presented in FIGS. 24 to 28, respectively for each respective cement paste sample and in FIGS. 29 to 31 for each respective mineral. Calcium sulphoaluminate (SA) is used here to designate the combination of monosulphoaluminate ($3CaO.Al_2O_3.CaSO_4.12H_2O$) and ettringite ($3CaO.Al_2O_3.3CaSO_4.32H_2O$). With hydration, the intensities of SA obviously increased. In samples with admixtures the increase in SA intensities at an early age was larger than in the sample without admixtures. In HAC cement samples M-1, M-2 and M-3, the hemihydrate peak diminished expeditiously and disappeared before 60 minutes with corresponding increase of gypsum peak. In the H-HAC cement samples M-4 and M-5, the hydration rate seemed very slow. Hemihydrate existed in the pastes for 24 hours and the intensity of SA was quite small in first 60 minutes even with admixture. With the increase of SA formation, gypsum was greatly consumed, which resulted in the decrease of gypsum's relative intensity at later ages as seen in FIGS. 29 to 31. Since the same content of plaster (hemihydrate) was used in all the mixtures, the relatively lower gypsum intensity mostly corresponded with a high rate of SA formation. The peak shift from 9.90° to 9.05° 2θ as hydration proceeded showed the composition change of calcium sulphoaluminate from monosulphoaluminate to ettringite. The patterns of cement pastes with admixtures exhibited a distinct background hump due to amorphous phase in the range of from 8° to 25° 2θ as seen in FIGS. 16 to 20 indicating acceleration of the hydration rate.

As seen in FIG. 21 in the X-ray diffraction analyses of expansive cement pastes after one day, it was obvious that the sulphoaluminate peak of the HAC cement pastes M-2 and M-3 with admixtures was higher than that of the HAC cement paste M-1 without admixtures, but no obvious difference could be found between the two samples M-2 and M-3 with different mixing processes. In the H-HAC cement paste samples M-4 and M-5, the SA peaks were much lower than that in the HAC type expansive cement, indicating a reduced rate of SA formation.

As seen in FIG. 22 at 3 days, the X-ray diffraction pattern of expansive cement pastes were similar to those at 1 day. But the relative intensities of designated minerals (SA, G or B) in different expansive cement pastes became somewhat similar.

As seen in FIG. 23 at 28 days, the five expansive cement pastes were not discernably different even in the intensity of each peak. The major hydration products were ettringite and calcium hydroxide while some unhydrated clinker phase such as $C_3S$ and $C_2S$ were also noted. However no characteristic peaks representing the hydration products of HAC, such as $3CaO.Al_2O_3.6H_2O$ could be detected.

Hardened Paste Specimens

To explore the microstructure of expansive cement paste, hardened specimens were prepared from the paste samples of Table 6 under conditions simulating those in real drilled shafts. Cylindrical specimens 26 mm in diameter and 50 mm high were cast in small steel tube moulds with 2 mm thick walls. Two 8 mm thick steel plates were placed at bogh ends of the steel mould and tightly screwed together using three 6 mm diameter threaded rods. At each end of the mould, there were two holes (3 mm in diameter each) for water supply during hydration. In the first 24 hours, the specimens were cured in air at 100% RH and 23° C., and then stored in 23° C., tap water. During the entire curing process, the specimens were subjected to three dimensional restraint. At designated ages, the threaded rods were removed and the steel moulds were cut longitudinally to obtain the paste cylinder specimens. The procedure was followed to avoid damage to the cement pastes during demoulding. Hardened paste from the central section of the specimen was then taken and crushed into 3–10 mm diameter particles. The hardened pastes were immersed in propanol for 24 hours to terminate hydration and then dried in a vacuum dessicator at a negative pressure of 100 kPa for 48 hours. The hardened pastes were then ground and sieved into three grades: particles with diameter of about 10 mm were chosen for scanning electron microscopy; particles with diameter of about 2–3 mm were favoured for porosimeter tests; and the rest of the material was ground together with 100% $CaF_2$ as an internal standard for X-ray diffraction tests.

A scanning electron microscope was used to evaluate the crystal growth and compare the expansion cracks existing in the hardened specimens of the cement paste of Table 6 with different admixtures and curing ages. Under the particular restraint conditions in the steel mould, the widths of cracks varied from 10 um to 30 um and they increased with an increase in age at early ages, but then decreased dramatically at 28 days. The surface texture of the 28-day specimens was dense and most remaining micro cracks were closed. At early ages, they were quite porous and the cracks extended through the sample.

At early ages, average crack widths of the HAC cement pastes M-2 and M-3 with admixtures were larger than those in HAC pastes M-1 without admixtures. While in the H-HAC expansive cement pastes M-4 and M-5 the crack widths were only about one-fifth of those in the HAC cement paste M-1, M-2 and M-3. At 28 days, the surface morphology of paste M-5 was totally different from those at early ages. Only traces of sulphoaluminate crystals could be found in some isolated areas.

The morphologies of SA in pastes at different ages were also studied with the scanning electron microscope. In the HAC cement paste M-1 without admixtures large size SA crystals (about 15–60 um long and 6 um in diameter) were commonly found. But in the HAC cement pastes M-2 and M-3 with admixtures, only small needle-shaped SA crystals existed in clusters, which these smaller crystals being about 3–5 µm long and 1 um in diameter. Although in the HHAC cement pastes M-4 and M-5 some SA crystals located in pores or cracks were large, about 10–20 µm long and 2 um in diameter, most other crystals were still smaller than those observed in the HAC cement pastes M-2 and M-3 with admixtures.

At early ages, most of the SA crystals appeared as conglomerations irregularly interlocked with each other, and those in the pores or cracks grew from solid side surfaces into the open space. At 28 days, ettringite could not easily be detected or identified because of the extreme dense structure of the hardened paste. Occasionally, some small clusters of ettringite could be found in the pores or some weak areas.

Figure 32:
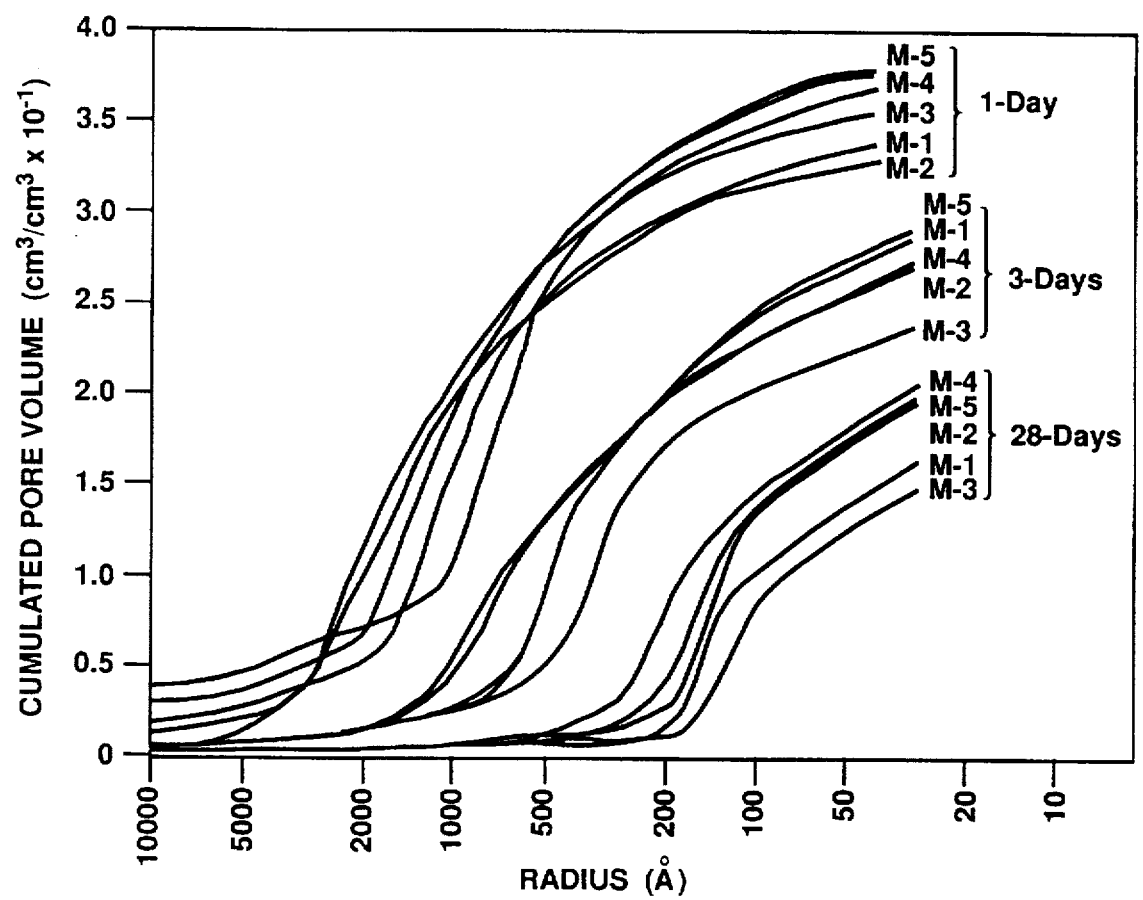
FIG. 32 is a graph showing the cumulative pore size distribution curves of expansive cement past samples at different times.

Cumulative pore size distribution curves of the expansive cement pastes hardened specimens were measured using a mercury intrusion porosimeter with a contact angle assumed to be 140°. The results are shown in FIG. 32. With hydration, cumulative pore volumes at all sizes decreased in all the pastes. At 28 days, the volume of pores larger than 400 A tended to be zero. This indicated that hydration products had filled in the pores. The total pore volume of H-HAC cement paste M-4 and M-5 was slightly higher than that of HAC cement pastes M-1, M-2 and M-3.

Figure 33:
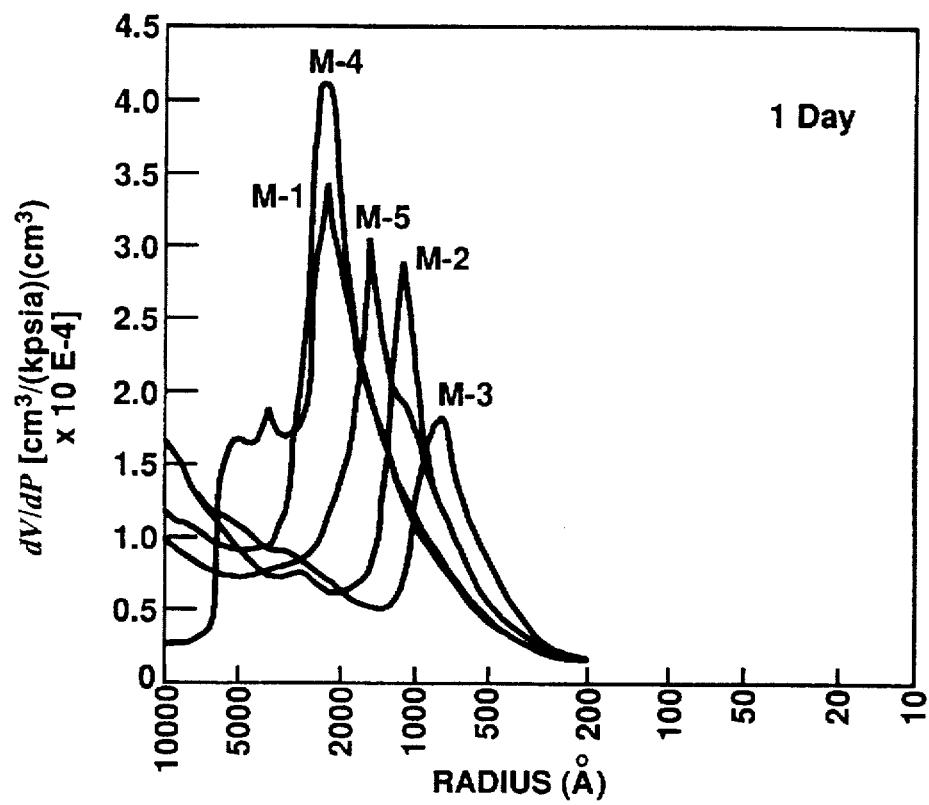
FIGS. 33, 34 and 35 are graphs showing differential pore size distribution curves of cement paste samples at 1, 3 and 20 days, respectively.
Figure 34:
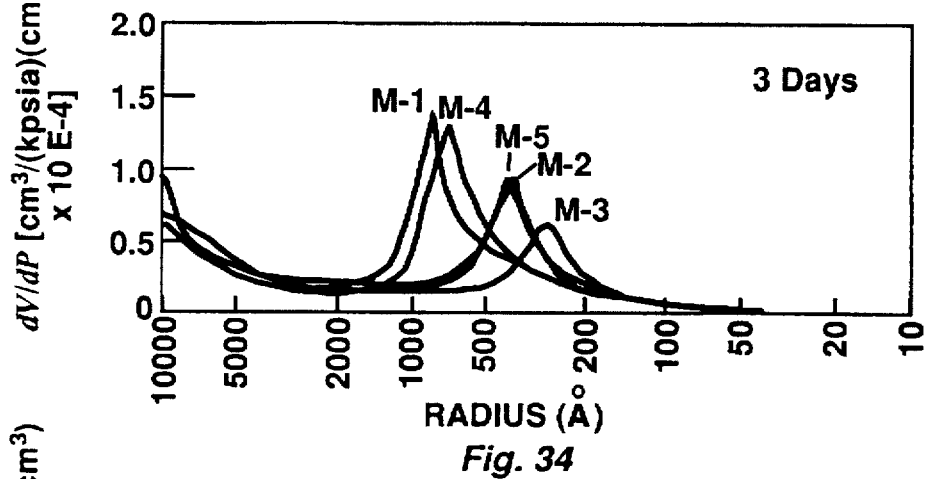
Figure 35:
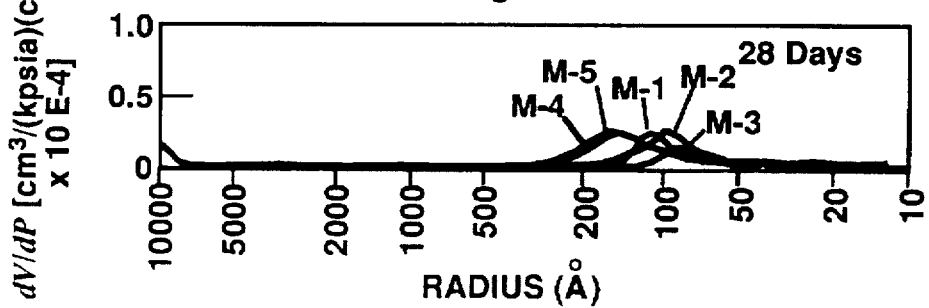

FIGS. 33 to 35 show the differential pore size distribution curves at different ages for expansive cement pastes. The most probable pore sizes (MPPS) of these samples at one-day (FIG. 33) were in the range of 600 A° to 3000 A°.

The HAC pastes M-1 and M-2 without admixture had the same MPPS of 3000 A°. As a result of using admixtures, the MPPS shifted to smaller sizes. At 3 days of hydration (FIG. 34) the MPPS range for these samples was between 300 A° and 900 A°. The effect of admixtures on the character of distribution curves was the same as that at one day.

FIG. 35 demonstrates differential pore size distributions of 28-day pastes. The MPPS were very low, from 80 A° to 160 A°. The MPPS of the H-HAC cement pastes M-4 and M-5 was larger than that of HAC cement pastes M-1, M-2 and M-3. This large reduction in pore volume is not common in normal cement pastes even incorporating silica fume, indicating that when restrained, expansive cements at later ages could have an extremely dense structure and high strength.

TABLE 1

Design of H-HAC Powders

| H-HAC Powder | Particle Size um | Prehydration Age | Cement Paste or Concrete Sample |
|---|---|---|---|
| A | 75–150 | 1 day | EP 49, E 11, M-4, M-5 |
| B | No grinding needed | 30 min. before final set | EP 50 |
| C | 75–150 | 1.5 hr. after final set | EP 51 |
| D | 75–150 | 7 days | EP 52 |
| E | 75 | 1 day | EP 53 |
| F | 150–300 | 1 day | EP 54 |

TABLE 2

Mix Design of Expansive Cement Paste Samples
Units: Mass

| Specimen No. | Type of Mixing Process | Portland Cement | Cement Fondu (HAC) | H-HAC Content | H-HAC Particle Size of (μm) | H-HAC Pre-hydration Age | Quick Set Platter | Hydrated Lime | Water | Delvo | Sodium Citrate | Lomar D | Fly Ash |
|---|---|---|---|---|---|---|---|---|---|---|---|---|---|
| EP1 | MPD-I | 480 | 200 | — | — | — | 96 | 24 | 320 | — | — | — | — |
| EP2 | MPD-I | 480 | 200 | — | — | — | 96 | 24 | 320 | 4 | — | — | — |
| EP37 | MPD-I | 400 | 250 | — | — | — | 120 | 30 | 320 | 2.4 | — | 12 | — |
| EP38 | MPD-I | 400 | 250 | — | — | — | 120 | 30 | 320 | — | 0.3 | 12 | — |
| EP40 | MPD-I | 400 | 250 | — | — | — | 120 | 30 | 368 | — | 0.3 | 12 | 120 |
| EP41 | MPD-II | 400 | 250 | — | — | — | 120 | 30 | 368 | — | 0.3 | 12 | 120 |
| EP42 | MPD-III | 400 | 250 | — | — | — | 120 | 30 | 368 | — | 0.3 | 12 | 120 |
| EP43 | MPD-IV | 400 | 250 | — | — | — | 120 | 30 | 368 | — | 0.3 | 12 | 120 |
| EP49 | MPD-I | 480 | — | 200 | 75–150 | 1 day | 96 | 24 | 320 | — | — | 6 | — |
| EP50 | MPD-I | 480 | — | 200 | No grinding needed | 30 min. before final set | 96 | 24 | 320 | — | — | 6 | — |
| EP51 | MPD-I | 480 | — | 200 | 75–150 | 1.5 hr. after final set | 96 | 24 | 320 | — | — | 6 | — |
| EP52 | MPD-I | 480 | — | 200 | 75–150 | 7 days | 96 | 24 | 320 | — | — | 6 | — |
| EP53 | MPD-I | 480 | — | 200 | <75 | 1 day | 96 | 24 | 320 | — | — | 6 | — |
| EP54 | MPD-I | 480 | — | 200 | 150–300 | 1 day | 96 | 24 | 320 | — | — | 6 | — |

TABLE 3

Proportions of Expansive Concrete Samples

| Specimen No. | Type of Concrete | Type of Mixing Process | OPC/EC | Portland Cement | Cement Fondu (HAC) | H-HAC | Moulding Plaster | Hydrated lime | Water | W/C | Stone | Sand | Sodium Citrate | Lomar D | Fly Ash |
|---|---|---|---|---|---|---|---|---|---|---|---|---|---|---|---|
| E6 | HAC | one-stage | 60/40 | 306 | 128 | — | 61 | 15 | 217 | 0.43 | 902 | 742 | — | — | — |
| E7 | HAC | two-stage | 60/40 | 306 | 128 | — | 61 | 15 | 217 | 0.43 | 902 | 742 | 0.19 | 7.6 | — |
| E8 | HAC | two-stage | 60/40 | 306 | 128 | — | 61 | 15 | 316 | 0.54 | 756 | 524 | 0.19 | 7.6 | 76 |
| E9 | HAC | two-stage | 50/50 | 260 | 163 | — | 78 | 19 | 300 | 0.50 | 772 | 534 | 0.20 | 7.8 | 79 |
| E11 | H-HAC | one-stage | 60/40 | 306 | — | 128 | 61 | 15 | 217 | 0.43 | 902 | 742 | — | 3.8 | — |

TABLE 4

Initial and Final Set of Cement Paste Samples

| Sample | Initial Set (minutes) | Final Set (minutes) |
|---|---|---|
| EP 40 | 65 | 78 |
| EP 41 | 67 | 72 |
| EP 42 | 130 | 210 |
| EP 43 | 155 | 230 |
| EP 49 | 480 | 510 |
| EP 50 | 27 | 31 |
| EP 51 | 348 | 378 |
| EP 52 | 486 | 516 |
| EP 53 | 426 | 486 |
| EP 54 | 510 | 540 |

TABLE 5

Design of Special Mixing Processes

| Type of Mixing Processes | Procedures of Mixing |
|---|---|
| MPD-I (one stage mixing process) | Mix all the cementitious materials (and aggregates, if any) in the mixer for 3 minutes. Add the water with dissolved retarder and superplasticizer and mix for 3 minutes. |
| MPD-II (two-stage mixing process) | Mix Portland cement plaster and water with dissolved retarder and superplasticizer in the mixer for 3 minutes; Wait for 5 minutes; Add the rest of the materials (Ciment Fondu, Lime and fly ash) with the previously mixed paste for 3 minutes. |
| MPD-III (two-stage mixing process) | Mix Portland cement, fly ash, plaster and water with dissolved retarder in the mixer for 3 minutes; Wait for 5 minutes; Add the rest of the materials (Ciment Fondu, Lime and superplasticizer) with the previously mixed paste for 3 minutes. |
| MPD-IV (two-stage mixing process) | Mix Portland cement, fly ash and water with dissolved retarder (and aggregates, if any) in the mixer for 3 minutes; Wait for 5 minutes; Mix the expansive components and superplasticizer with the previously mixed paste for 3 minutes. | bridges when the soil is unsuitable for supporting stresses transmitted by the foundation.

Expansive concrete compositions having a free expansion of about 4% can be used for bored piles. These expansive concretes produce a stronger bond between the shaft concrete and the surrounding soil, (ie. higher "skin friction"), thus enabling the shaft-soil system to carry a higher load. Settlement is also reduced due to the increased load transferred to the soil by the sides of the shaft.

In tests conducted by Sheikh et al., "Expansive Concrete Drilled Shafts", Canadian Journal of Civil Engineering, Vol. 12, No. 2, 1985, pp. 382–395, it was determined that the use of expansive concrete increased skin friction by 25–50% and reduced settlement by about 50% in shafts built in over consolidated clay.

Although the invention has been described in connection with certain preferred embodiments, it is not intended that it be limited thereto. Rather, it is intended that the invention cover all alternate compositions, equivalents, and embodiments as may be within the scope of the following claims.

I claim:

1. A cement composition formed by mixing:
   (a) a Portland cement component; and
   (b) an expanding component, comprising:
      (i) a partially hydrated high alumina cement powder consisting of coated particles, said particles consisting of an inner core consisting of unhydrated high alumina cement and an outer coating consisting of hydration products of high alumina cement, said coating delaying reaction between the high alumina cement of the core of the particles and other materials in the cement composition; and
      (ii) a calcium sulfate substance selected from the group consisting of anhydrous calcium sulfate, hemihydrate calcium sulfate and dihydrate calcium sulfate;
   said partially hydrated high alumina cement powder being formed independently and prior to mixing with the remainder of the composition.

2. The cement composition of claim 1, wherein the expanding component additionally comprises:

TABLE 6

Proportions of Expansive Cement Paste Samples
Units: mass

| | | Expansive Components | | | | | | |
|---|---|---|---|---|---|---|---|---|
| | Ordinary Portland | Al-bearing Material | | S-Bearing Material | | Admixture | | Type of Mix |
| Sample | Cement | HAC | H-HAC | Quick Set Plaster | Hydrated Lime | Lomar-D | Sodium Citrate | Water | Process |
| M-1 | 0.6 | 0.25 | — | 0.12 | 0.03 | — | — | 0.43 | MPD-I One-stage |
| M-2 | 0.6 | 0.25 | — | 0.12 | 0.03 | 0.015 | 0.000375 | 0.43 | MPD-I One-stage |
| M-3 | 0.6 | 0.25 | — | 0.12 | 0.03 | 0.015 | 0.000375 | 0.43 | MPD-IV Two-stage |
| M-4 | 0.6 | — | 0.25 | 0.12 | 0.03 | — | — | 0.43 | MPD-I One-stage |
| M-5 | 0.6 | — | 0.25 | 0.12 | 0.03 | 0.0075 | — | 0.43 | MPD-I One-stage |

The expansive cement of the present invention is particularly useful in highly expansive concrete compositions for use in drilled shafts (bored piles). Bored piles are used to support foundations of structures such as buildings and (iii) a calcium oxide substance selected from calcium oxide and calcium hydroxide.

3. The cement composition of claim 1, wherein the outer coating resists penetration of water into the inner core.

4. The cement composition of claim 1, wherein the ratio of Portland cement component to expanding component is from about 1:1 to about 4:1, and the ratio of the partially hydrated high alumina cement powder to the calcium sulfate substance is from about 0.5:1 to about 4:1.

5. The cement composition of claim 4, wherein the ratio of Portland cement component to expanding component is from about 1.5:1 to about 2:1.

6. The cement composition of claim 1, wherein the ratio of the partially hydrated high alumina cement powder to the calcium sulfate substance is from about 0.5:1 to about 4:1.

7. The cement composition of claim 2, wherein the ratio of the partially hydrated high alumina cement powder to the calcium oxide substance is from about 4:1 to about 15:1.

8. The cement composition of claim 2, wherein the calcium oxide substance is calcium oxide.

9. The cement composition of claim 1, wherein the calcium sulfate substance is anhydrous calcium sulfate.

10. The cement composition of claim 1, additionally comprising a superplasticizer.

11. The cement composition of claim 10, wherein the superplasticizer is condensed naphthalene sulfonate.

12. The cement compositions of claim 1, wherein the particles are less than about 300 µm in size.

13. The cement compositions of claim 1, wherein the particles are less than about 150 µm in size.

14. The cement composition of claim 10, wherein the ratio of expanding component to superplasticizer is from about 30:1 to about 35:1 by weight, and the ratio of the partially hydrated high alumina cement powder to the calcium sulfate substance is from about 0.5:1 to about 4:1.

15. A cement composition formed by mixing:
   (a) a Portland cement component;
   (b) a partially hydrated high alumina cement powder;
   (c) a calcium sulfate substance selected from the group consisting of anhydrous, hemihydrate and dihydrate calcium sulphate, and
   (d) a calcium oxide substance selected from calcium oxide and calcium hydroxide;
   wherein said partially hydrated high alumina cement powder is formed independently and prior to mixing with the remainder of the composition by a process of:
   (i) forming a mixture consisting of water and unhydrated high alumina cement, the ratio of high alumina cement to water being from about 1:1 to about 4:1;
   (ii) allowing the mixture of high alumina cement and water to set; and
   (iii) mechanically reducing the product of step (ii) into a resultant powder.

16. The cement composition of claim 15 wherein the unhydrated high alumina cement has an average particle size by weight in the range of 15 to 50 µm.

17. The cement composition of claim 16 wherein the unhydrated high alumina cement has substantially no particles greater than about 50 µm and no more than 15% by weight of its particles smaller than about 5 µm.

18. The cement composition of claim 15 wherein the ratio of high alumina cement to water in the mixture is from about 2:1 to about 3:1.

19. The cement composition of claim 15, wherein the mixture of high alumina cement and water is allowed to set for a period at least equal to the final set time of the mixture.

20. The cement composition of claim 19, wherein the mixture of high alumina cement and water is allowed to set for a period of not greater than about 24 hours.

21. The cement composition of claim 15, wherein the process for preparing the partially hydrated high alumina cement powder includes the step of sieving the resultant powder to provide a resultant product comprising particles ranging in size from less than 75 µm to about 300 µm.

22. The cement composition of claim 21, wherein the resultant product comprises particles ranging in size from about 75 µm to about 150 µm.

23. The cement composition of claim 15, wherein the ratio of the partially hydrated high alumina cement powder to the calcium sulfate substance is from about 0.5:1 to about 4:1.

24. The cement composition of claim 15, wherein the partially hydrated high alumina cement powder comprises particles less than about 300 µm in size.

25. The cement composition of claim 24, wherein the partially hydrated high alumina cement powder comprises particles less than about 150 µm in size.

26. The cement composition of claim 1, wherein said partially hydrated high alumina cement powder being formed by a method comprising the steps of:
   (A) forming a mixture consisting of water and unhydrated high alumina cement, the ratio of high alumina cement to water being from about 1:1 to about 4:1;
   (B) allowing the mixture of high alumina cement and water to set for a period at least equal to the final set time;
   (C) mechanically breaking the product of step (B) into particles;
   (D) at least partially drying the particles; and
   (E) grinding the particles of step (D) into a resultant powder.

27. The cement composition of claim 15, wherein step (iii) in the process for preparing the partially hydrated high alumina cement powder comprises:
   (A) mechanically breaking the product step of (b) into particles;
   (B) at least partially drying the particles; and
   (C) grinding the particles of step (B) into a resultant powder.

* * * * *